United States Patent [19]

Yanagida et al.

[11] Patent Number: 5,352,385

[45] Date of Patent: Oct. 4, 1994

[54] JOINING AGENT FOR JOINING CERAMIC WITH ELECTRIC JOINING METHOD

[75] Inventors: Hiroaki Yanagida, Chofu; Akio Matsui, Ikeda; Tokumitsu Nishi, Osaka; Kouji Okuda, Kobe; Hiroshi Takai, Nishinomiya; Hisakiyo Hoshino, Settsu; Masahi Numano, Takatsuki; Natsumi Miyake, Toyonaka, all of Japan

[73] Assignee: Daihen Corporation, Osaka, Japan

[21] Appl. No.: 834,258

[22] PCT Filed: Jun. 13, 1991

[86] PCT No.: PCT/JP91/00796

§ 371 Date: Mar. 25, 1992

§ 102(e) Date: Mar. 25, 1992

[87] PCT Pub. No.: WO91/19689

PCT Pub. Date: Dec. 26, 1991

[30] Foreign Application Priority Data

| Jun. 13, 1990 [JP] | Japan | 2-154266 |
| Jun. 13, 1990 [JP] | Japan | 2-154267 |
| Jul. 19, 1990 [JP] | Japan | 2-191912 |
| Aug. 10, 1990 [JP] | Japan | 2-213068 |
| Dec. 25, 1990 [JP] | Japan | 2-405758 |

[51] Int. Cl.$^5$ .................. H01B 1/00; H01B 1/06
[52] U.S. Cl. .................. 252/521; 252/520; 252/518; 501/123; 501/144; 106/286.6; 106/286.7
[58] Field of Search .................. 252/518, 520, 521; 501/108, 123, 144; 106/1.25, 286.6, 286.7; 156/325, 283

[56] References Cited

U.S. PATENT DOCUMENTS

| 4,447,283 | 5/1984 | Ebata et al. ............. 156/325 |
| 4,486,257 | 12/1986 | Ebata et al. ............. 156/325 |
| 4,724,020 | 2/1988 | Ebata et al. ............. 156/82 |
| 4,976,806 | 12/1990 | Iwamoto et al. ......... 501/123 |

FOREIGN PATENT DOCUMENTS

| 60-151284 | 8/1985 | Japan . |
| 59-156975 | 9/1985 | Japan . |
| 61-54748 | 11/1986 | Japan . |
| 62-65986 | 3/1987 | Japan . |
| 62-148380 | 7/1987 | Japan . |

Primary Examiner—Paul Lieberman
Assistant Examiner—M. Kopec
Attorney, Agent, or Firm—Scully, Scott, Murphy & Presser

[57] ABSTRACT

Described in a joining agent for joining electrically ceramic bodies by heating the joining agent inserted at the parts to be jointed between the ceramic bodies with an electric current flowing predominantly through the joining agent at high temperature. The joining agent is superior in the wetability and reactivity with the ceramics to ensure the joint part strength. The joining agent includes, as an electric conductor, an electric conductive component made of an ion conductor consisting of fluoride, chloride, and/or oxide, which forms carrier ions by the pre-heating and has an electric conductivity higher than that of the ceramic body at the electric current supplying time. During the supplying electric current to time, the joining agent has the electric resistance increased gradually at the molten state of the joining agent by decreasing the density or the mobility of the carrier ions. After the electric heating, the joining agent is changed into a composition having a high electric resistance and hence the electric current path moves smoothly.

3 Claims, 2 Drawing Sheets

JOINING AGENT FOR JOINING CERAMIC WITH ELECTRIC JOINING METHOD

BACKGROUND OF THE INVENTION

Previously, there has been disclosed various kinds of joining agents, such as inorganic solder comprising various oxides, fluorides and various metal solders comprising various metals for joining ceramic bodies to each other. For example, a joining agent composed of powder mixture of $CaF_2$ and kaolinite is applied to parts to be joined of silicon nitride ceramic plates and then heated at 1400° to 1500° C. in furnace to obtain jointed ceramics by a reaction of the joining agent and the silicon nitride ceramic (Japanese patent application, 32084/1983). The use of the $CaF_2$ is in a purpose that the $CaF_2$ decomposes thermally at a high temperature and produces $F_2$ gas which corrodes or eats away the surface of the ceramic. As a result, the reaction product between calcium and kaolinite promotes the reaction of the joining agent with the ceramics. When the joining agent is selected to be in a good wetability and a high reactivity with the ceramic, the joint part between the ceramic bodies are completed upon heating the joining agent at a temperature higher than its melting point. A conventional heating method is to heat the whole of ceramics with the joining agent in the furnace at an joining temperature to achieve the joining. When the ceramic body in a large size or a long size is jointed, it is necessary to use a large furnace or to take a long time for heating up or cooling down. This results in the problem such as the limitation of the equipment and an increase in the equipment cost or running cost. Further, the higher joining temperature may cause the thermal degradation of the ceramic body. Therefore, the problem occurs with the application field requiring the thermal resistance. Since the heating method to heat the whole of the ceramic body with the joining agent has various problems as mentioned above, it is desirable to achieve an joining method to heat partially only the part to be jointed. In order to solve the problems, U.S. Pat. No. 4,724,020 has reported one of electric joining methods for the ceramic bodies.

The electric joining method is carried out in the following way: The planes to be jointed of ceramic bodies are applied with an joining agent having an electric conductivity at a high temperature and are pre-heated by a gas flame to a temperature more than about 800° C. in advance. A high voltage is applied across a pair of electrodes to supply electric current to the joining agent. Then the joining agent is heated by the Joule heat and is melted to complete the ceramic joining through the reaction between the joining agent and the ceramics.

PROBLEM TO BE SOLVED BY THE PRESENT INVENTION

The electric joining method mentioned above has an advantage to decrease the joining cost including the equipment cost and running cost even with the large size or the long size ceramic bodies and to suppress the thermal degradation of the ceramic material. However, the electric joining method has the following disadvantage: The conventional joining agent used in a furnace is required only to satisfy the wetability and the reactivity with the ceramics. On the other hand, the joining agent used in the electric joining method must have an electric conductivity at a high temperature in addition to the above properties because the joining is completed by supplying electric current to the joining agent. Accordingly, the joining agent in the conventional type using a high temperature furnace is not always applicable for the electric joining method. It is necessary to develop the joining agent suitable for the electric joining method.

U.S. Pat. No. 4,724,020 reported the joining agent applicable for the electric joining method, which has such an electrical conductivity that permits the electric current of several 10 mA to flow under the voltage of 1,000 to 10,000 V at a temperature higher than 800° C. As a practical matter, there is disclosed such a joining agent includes, as a main constituent, glass comprising kaolinite, $Al_2O_3$, and $SiO_2$ and, as an additive, oxide, sulfide or chloride of copper, nickel, manganese, indium, molybdenum, or zinc, or oxide of rare earth material such as lanthanum, indium, vanadium, holmium and yttrium, or metal such as molybdenum, manganese, tungsten, iron, copper, silver, nickel, tin and zinc, or fluoride such as calcium fluoride and sodium fluoride. The joining agent having no electrical conductivity is added with a material having an electrical conductivity such as carbon, fluoride, glass, metal oxide and rare earth materials.

However, it is found through the practical use by the inventors the fact that the joining agent having only the electrical conductivity and the reactivity with the ceramics does not always result in a formation of good joint. For example, an joining agent can have a metal powder as an electrical conductor added into glass and permits the electric current to flow therethrough. However, the electric current localizes predominantly at the metal powder portion. As a result, the part to be jointed is not heated uniformily and is not formed into a good joint. Especially, there is a big problem with the ceramic body in a long size to be jointed. Therefore, it is found that the joining agent provided only with the electric conductivity is not sufficient for executing the electric joining method.

As a result of the inventive investigation, the present inventors have noted that it is necessary to develop a joining agent to permit the electric current path to move smoothly with a movement of the electrode when the ceramic part is jointed by an electric joining method. It has been known in the present technical field that the joining agent has generally an electrical conductivity in a positive characteristic and makes it difficult to move the electric current path with the movement of the electrode. Against the above information, the present inventors have found that there may be an joining agent to permit the electric current path to move with the movement of the electrode after investigation of heating mechanism with various joining agents.

Referring to FIG. 1 showing a time variation in the electric resistance of the joining agent, an increase in the voltage of the electric source causes initially a slight electric current (referred to "initial driving current" hereinafter) to flow through the joining agent in the first range I. At the next step, the electric current increases rapidly at a given value of the voltage and subsequently the load voltage decreases rapidly in the second range II. After that, at a range where the electric current is a constant value, the load voltage gradually increases, that is, at this range, the joining agent changes in the composition and is in a higher electric resistance (this range is referred to the third range III hereinafter). Therefore, followed with the movement of electrode or even without any movement of electrode, the electric current path moves sequentially to an area in a lower electric resistance from an area in a higher electric resistance. That is, without any external force, the electric current path tends to be made automatically at an area for flowing of electric current and thus move voluntarily to any lower electric resistance areas from higher ones. Finally, thereby the reaction between the joining agent and a pair of ceramic bodies proceeds sufficiently to join the ceramic bodies in accordance with the change in the composition into a higher electric resistance.

Accordingly, an object of the present invention is to provide an joining agent to change in the composition to a high electric resistance and thereby the load voltage increases gradually at the range in which a change in the electric current comes to a constant value as shown in FIG. 1.

SUMMARY OF THE INVENTION

The present invention has been achieved on the basis of our findings that the reason why the joining agent shows the time change in the electric resistance as shown in FIG. 1 is in the fact that an electroconductive component comprising the ion conductor has the property that a rosined ion carrier density or mobility is decreased by means of an ion carrier diffusion process into the mother material, and by means of reactions of the ion carrier with the mother material or other joining agent, the oxygen in the atmosphere and the water resulting from the decomposition of flame.

According to the present invention, there is provided an joining agent for use in the electric joining method, which comprises an electroconductive component for providing the electric conductive property shown at the application of electric field and a joining component for providing a wetability to the ceramic bodies to be jointed at the molten state and a high bonding strength at the curing state, wherein the electroconductive component is selected from the group consists of fluoride, chloride and/or oxide ion conductor which forms an ion carrier at the preheating range and makes said joining agent have an electric conductivity higher than that of the ceramics to be jointed at the electroheating range, and the density or the mobility of the carrier ion decreases at the molten state to increase gradually the electric resistance of the joining agent at the molten state.

The ion conductor capable of forming the ion carrier by the preheating and of increasing gradually the electric resistance of the joining agent at the molten state may be selected from the group consisting of fluoride or chloride which forms $F^-$ ion or $Cl^-$ ion having a high mobility and which is in a solid state at room temperature. The effective material is, for example, alkali metal fluoride or chloride such as LiF, NaF, KF, LiCl, NaCl or KCl; alkaline earth metal fluoride or chloride such as $MgF_2$, $CaF_2$, $SrF_2$, $BaF_2$, $MgCl_2$, $CaCl_2$; or fluoride or chloride of rare earth metal such as $SCF_3$, $YF_3$, $LaF_3$, $CeF_3$, $ScCl_3$, $YCl_3$, $LaCl_3$. Among them, as the chloride has a deliquescence property, the fluoride is superior in handling. In addition to the above materials, the other ion conductor may be selected from the group consisting of alkali metal oxides such as $Li_2O$, $Na_2O$ or $K_2O$ and alkali earth metal oxides such as MgO, or CaO, which can produce cation having a rather high mobility.

Among those possible fluoride materials, NaF and $CaF_2$ are low in the cost and are superior in the reproducibility and the stability. Especially, Sodium fluoride NaF is suitable for the electric conductive component of the joining agent for use in oxide ceramics and calcium fluoride $CaF_2$ is suitable for the electric conductive component of an joining agent for joining silicon nitride ceramics. In comparison with the above fluoride materials, $LaF_3$, $YF_3$ or $ScF_3$ is expensive but acts as a joining component to prevent the decrease in the joining strength due to the remained Ca and Na elements at the joint layer. Among the above oxide materials, the alkaline earth metal oxide such as CaO or MgO is inexpensive and does not produce a poisonous gas such as fluorine gas in a case of fluoride and further has an useful electric conductivity even though it is inferior to that of fluoride. Therefore, it is preferable or allowable to use as an electroconductive component, a mixture of more than two kinds of the above conductive materials so as to have the suitable electroconductive property in accordance with the application field instead of using one kind of the above conductive material.

A lower limit of the mixing ratio of the conductive component with the joining component is determined on the basis of an amount to permit the electric current to flow in a size necessary for producing a sufficient Joule heat during the application of electric field, while a upper limit of the mixing ratio is determined on the basis of an amount not to decrease the strength of the joining agent. In addition, another importance factor to be determined for the mixing ratio is a variation ratio of the electric resistance, which varies with the kind and the mixing ratio of the conductive material, the kind and the heating degree (of ceramics to be jointed). If the resistance variation ratio of the joining agent is too small, the movement characteristic of electric current path becomes worse. Hence, it is sometimes difficult to obtain an excellent joined part at the whole of the planes to be jointed. On the other hand, if the variation ratio is too large, it may be difficult to permit the electric current to flow due to the resulting high electric resistance of the joining agent before the sufficient reaction between the joining agent and the ceramic bodies to be jointed. Accordingly, in order to carry out the reproducible joining, it is necessary to select a joining agent having a suitable resistance variation ratio within the above basic range.

On the other hand, the joining component may be prepared by using, as a glass component, usual oxides such as kaolinite, $Al_2O_3$ and $SiO_2$ and as additive component, $Y_2O_3$, AlN or $Si_3N_4$ in a desired mixing ratio according to the kind of the ceramic bodies to be jointed. It is also possible to use, as an joining component, a transition metal oxide such as NiO, MnO, $ZrO_2$, ZnO or $TiO_2$ in combination with the above joining component. However, the mixing ratio should be adjusted in a way to satisfy a good wetability to the ceramic and the necessary joining strength.

On the basis of the above aspects, a second object of the present invention is to provide a $CaF_2$ joining agent which is used in the electric joining method executed, for example, with the high heat-resisting ceramics such as silicon nitride and which is superior in the reproducible and stable formation of joint part and is provided with a practically usable joining strength at a high temperature.

Further, a third object of the present invention is to provide a NaF joining agent which is used in the electric joining method for oxide ceramics superior in the reproducible and stable formation of the joint part and is provided with a practically usable joining strength.

It has been found that the joining agent including, as an electroconductive component, $CaF_2$ or NaF forms a good reproducible and-stable joint.

However, the joining agent including $CaF_2$ or NaF forms a joint layer having the Ca or Na element left therein. This causes the joint part to be inferior in the joining strength, the heat resistance and the corrosion resistance. In connection with the joining strength at high temperature, $Ca^{2+}$ ions or $Na^+$ ions in the joint layer make a viscosity at a high temperature of the joint layer to be decreased and thus causes the joining strength at a high temperature to be lowered. For example, $Si_3N_4$ ceramic joint part is very low in the joining strength at a temperature higher than 1000° C.

A fourth object of the present invention is to provide a rare earth element fluoride joining agent system which is used in the electric joining method and which can improve the joining strength and the corrosion resistance at the joint part of the ceramic body used as a structure material.

The above-mentioned joining agent of fluoride system is superior in the electric conductivity but has a disadvantage that the fluorine gas generated with the decomposition of the joining agent may weaken the glass structure to decrease the joining strength. The fluorine gas is poisonous and corrosive and is desirably eliminated from the joining agent.

Therefore, a fifth object of the present invention is to provide an alkali metal oxide joining agent system without any fluorine compound in order to obtain an joining agent which is used in the electric joining method carried out with the silicon nitride ceramic joining and is superior in the reproducible and stable joint part formation.

The second object of the present invention is to provide an joining agent suitable for use in the electric joining method with the silicon nitride ceramic. The joining agent comprises, as a basic component, $CaF_2$ of 10 to 40 weight % $Al_2O_3$ more than 10 weight % and the residual of $SiO_2$ and as an additives, at least one element of $Y_2O_3$ of 10 to 55 weight % and $Si_3N_4$ of 15 to 45 weight %.

In the above joining agent the proper centent range of $CaF_2$ is 10 to 40 weight %. $CaF_2$ more than 40 weight % makes the joining strength lower at a high temperature and $CaF_2$ less than 10 weight % makes the electric conductivity lower and causes the defective joint part.

An use of aluminum oxide results in the following function: Al incorporated with Ca in the joint layer suppresses the action of Ca at a high temperature because of 4 coordination of Al and thus increases the viscosity (softening temperature) of the joint layer to elevate the joining strength at a high temperature.

The proper content range of $Al_2O_3$ is more than 10 weight %. The content of $Al_2O_3$ less than 10 weight % can not achieve the above function mentioned above and decreases the joining strength at a high temperature.

The addition of silica is to promote the wetability to the ceramics and elevates the joining strength at a room temperature and at a high temperature when compared with a case having only $Al_2O_3$ incorporated. The decrease in the amount of $CaF_2$ can be compensated by the addition of $SiO_2$ in a similar way to the addition of $Al_2O_3$.

The incorporated $Y_2O_3$ enters the net work structure of silicate (silicate glass) at the joint layer and increases the elastic coefficient at the joint layer. As a result, the joining agent with $Y_2O_3$ incorporated increases the joining strength over the joining agent without $Y_2O_3$. The higher amount of the additive $Y_2O_3$ does not always result in the higher strength of the joint layer. An excess of Y element enters the joint layer (silicate glass) and destroys the net work structure of silicate to decrease the softening temperature, which results in the decrease in the joining strength at a high temperature. The additive Y element reacts with the other component of the joining agent to determine the joining strength but the effect to increase the joint part strength can be achieved by an addition of $Y_2O_3$ of 10 to 55 weight %.

The addition of $Si_3N_4$ makes the joint layer to be oxynitride and changes the thermal expansion coefficient near to that of the mother material and elevates the elastic coefficient. Further, the softening temperature is also elevated and accordingly the strength of the joint layer is elevated at room temperature and at a high temperature. As a result, the joining agent with the additive $Si_3N_4$ increases the joining strength over that without additive $Si_3N_4$. An increase or decrease in the amount of the additive $Si_3N_4$ is not in a regular relation with the increase or decrease in the joining strength. An excess of additive $Si_3N_4$ makes the electric current flow poor and results in the poor joint layer. Because it is thought that the material of $Si_3N_4$ is very stable. The additive content of $Si_3N_4$ requires 15 to 45 weight % to obtain a predetermined effect from various experiments.

The third object of the present invention is to provide the joining agent system for oxide ceramics and can be achieved by composition including NaF of 5 to 20 weight % and the residual of at least one element selected from the group consisting of $SiO_2$, $Al_2O_3$, $TiO_2$, $Y_2O_3$ and MgO.

This joining agent is based on NaF, however, NaF of more than 20 weight % make the joinining strength at a high temperature lowered while NaF of less than 5 weight % makes the electric current flow poor and results in the defective joint.

The addition of $SiO_2$ promotes the wetability to the ceramics to be joined and also compensates the decreased amount of NaF.

The addition of $Al_2O_3$ can repair the net work (silicate glass structure) having a non-bridging oxygen formed by the incorporation of Na element therein and elevate the softening temperature of the joint layer. Accordingly, the strength of the joint layer at a high temperature can be elevated.

MgO is an electroconductive component and can elevate the electric conductivity without increasing the amount of NaF and also make the glass structure stronger at the range of 2.5 to 10 weight %. As a result, the joining strength at room temperature and a high temperature is made higher.

The additive $Y_2O_3$ enters the silicate net work structure at the joint layer (silicate glass) and permits the joint layer to have a higher elastic coefficient. Accordingly, the joint strength is made stronger than that of the joint without $Y_2O_3$.

The additive $TiO_2$ has the same effect as $Y_2O_3$.

Further, the fourth object of the present invention is achieved by the following composition: The joining agent includes, as fluoride additives, rare earth element fluoride such as $LaF_3$, $ScF_3$ or $YF_3$ and achieves the higher strength at a high temperature. The composition is the rare earth element fluoride more than 15 weight % and the residual of at least one element selected from the group consisting of $Al_2O_3$ and $SiO_2$.

The reason for limiting the rare earth element fluoride to more than 15 weight % is that the joining agent having the rare earth element fluoride less than 15 weight % is in a high electric resistance and does not permit the electric current to flow. Even when the electric current flows, the generation of Joule heat is not uniform. Accordingly, non-melting parts sometimes remain and results in the poor properties.

The joining agent including at least one element selected from the group consisting of $Al_2O_3$ and $SiO_2$ as a component for wetability improves the wetability with the ceramics to be joined on melting and results in the superior joint.

A composition of about 100 weight % of the rare earth element fluoride $LaF_3$, $ScF_3$, or $YF_3$ can achieve the superior joint. The reason is that when the $Si_3N_4$ ceramics are joined by the joining agent, the joining agent catches $SiO_2$ produced by a oxidizing reaction of the mother material and the components of the sintering aids for the mother material and accordingly improves the wetability.

The joint part achieved by the joining agent according to the present invention is improved in the joint strength, especially the strength at a high temperature and the corrosion resistance in the following reason: When a comparison is made between the IIIA group element (La, Y, and Sc) obtained from the rare earth element fluoride ($LaF_3$, $ScF_3$, or $YF_3$) and group of (Ca or Na) obtained from $CaF_2$ or NaF, $La^{3+}$ ion, $Sc^{3+}$ ion, $Y^{3+}$ ion, $Ca^{2+}$ ion or $Na^+$ ion destroys the Si—O net work structure in the joint layer and enters the net work structure as a glass modifying ion. The glass having $La^{3+}$, $Sc^{3+}$, or $Y^{3+}$ ion incorporated therein is superior in the various properties to the glass having $Ca^{2+}$, or $Na^+$ ion incorporated therein.

The higher joint strength comes from the higher packing density of the glass at the joint layer, which makes the strain ratio of glass smaller to improve the Young's modulus. Further, the higher strength at a high temperature results from the reason that $La^{3+}$, $Sc^{3+}$ or $Y^{3+}$ ion has a stronger bonding force with oxygen and improves the softening temperature, that is, the viscosity at a high temperature.

Next, the description is directed to a reason why the joining agent according to the present invention improves the corrosion resistance against acid and alkali. The corrosion by the acid solution is carried out by exchanging between $H^+$ ion or $H_3O^+$ ion in the corrosive solution and the modifying ions in the net work of glass. Accordingly, $La^{3+}$ ion, $Sc^{3+}$ ion, or $Y^{3+}$ ion has a stronger bonding force with oxygen than $Ca^{2+}$ ion or $Na^+$ ion and makes it difficult to be exchanged with $H^+$ ion or $H_3O^+$ ion. This results in the improvement of the corrosion resistance. The corrosion with the alkali solution is carried out by destroying the bonding Si—O in the net work in glass with $OH^-$ ion in the corrosion solution. The glass having $La^{3+}$ ion, $Sc^{3+}$ ion or $Y^{3+}$ ion incorporated therein increases the packing density and restrains the diffusion of $OH^-$ ion and improves the corrosion resistance.

The fifth object of the present invention is achieved by using, as a electric conductive component, the alkali earth metal oxide such as CaO and MgO instead of fluoride. Other component than the electric conductive material can be composed of $Al_2O_3$, $SiO_2$, $Y_2O_3$, and/or $Si_3N_4$.

The joining agents of a CaO system are in a composition of 15 to 50 weight % of CaO and a mixing ratio range and a function of the residual of $Al_2O_3$, $SiO_2$, $Y_2O_3$, $Si_3N_4$ is similar to those of the $CaF_2$ system.

The joining agents of a MgO system are in a composition of 10 to 45 weight % of MgO and a mixing ratio range and a function of the residual of $Al_2O_3$, $SiO_2$, $Y_2O_3$, $Si_3N_4$ is similar to those of the $CaF_2$ system.

The joining agents of a MgO system can be improved in the strength at a high temperature by adding the transition metal oxide such as NiO, MnO, $ZrO_2$, ZnO or $TiO_2$ in a desired ratio.

THE BEST MODE FOR PRACTICING THE INVENTION

Figure 1:
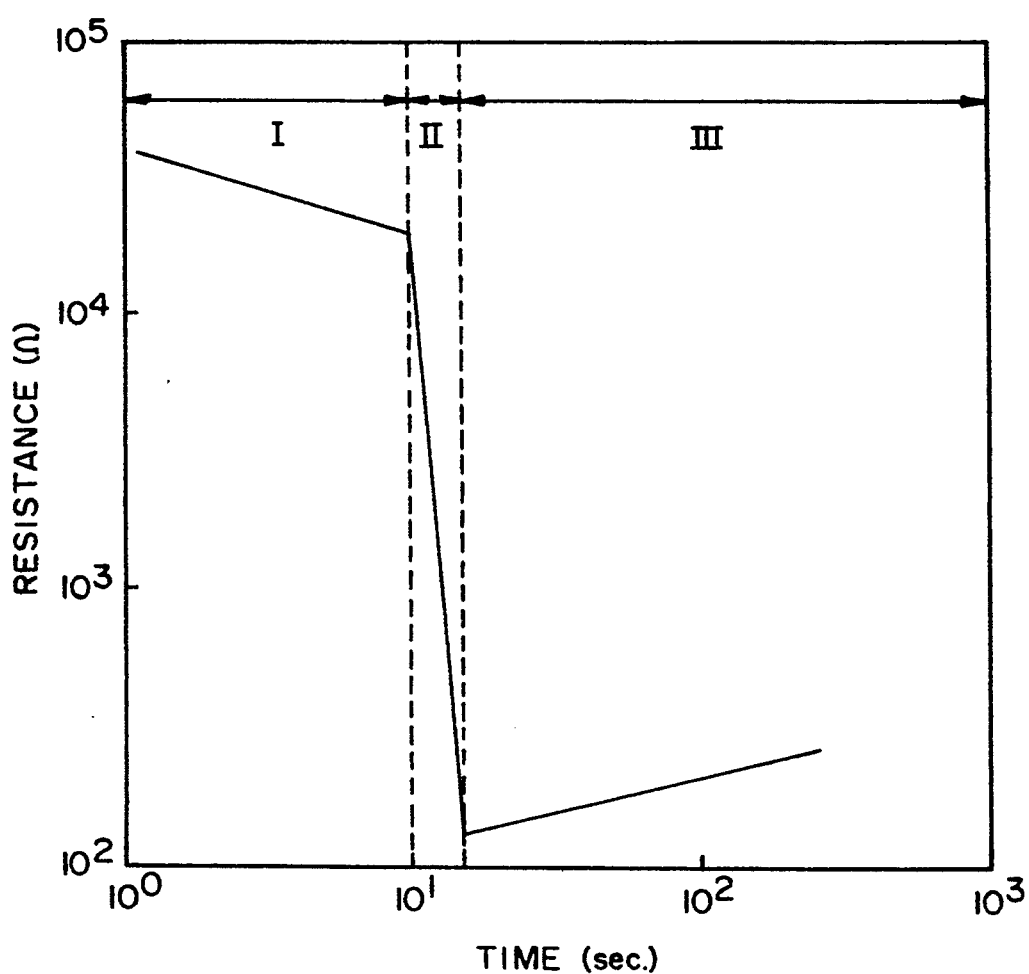
FIG. 1 is a graph showing a time passage of the variation in the electric resistance of the joining agent for use in the electric joining method.
Figure 2:
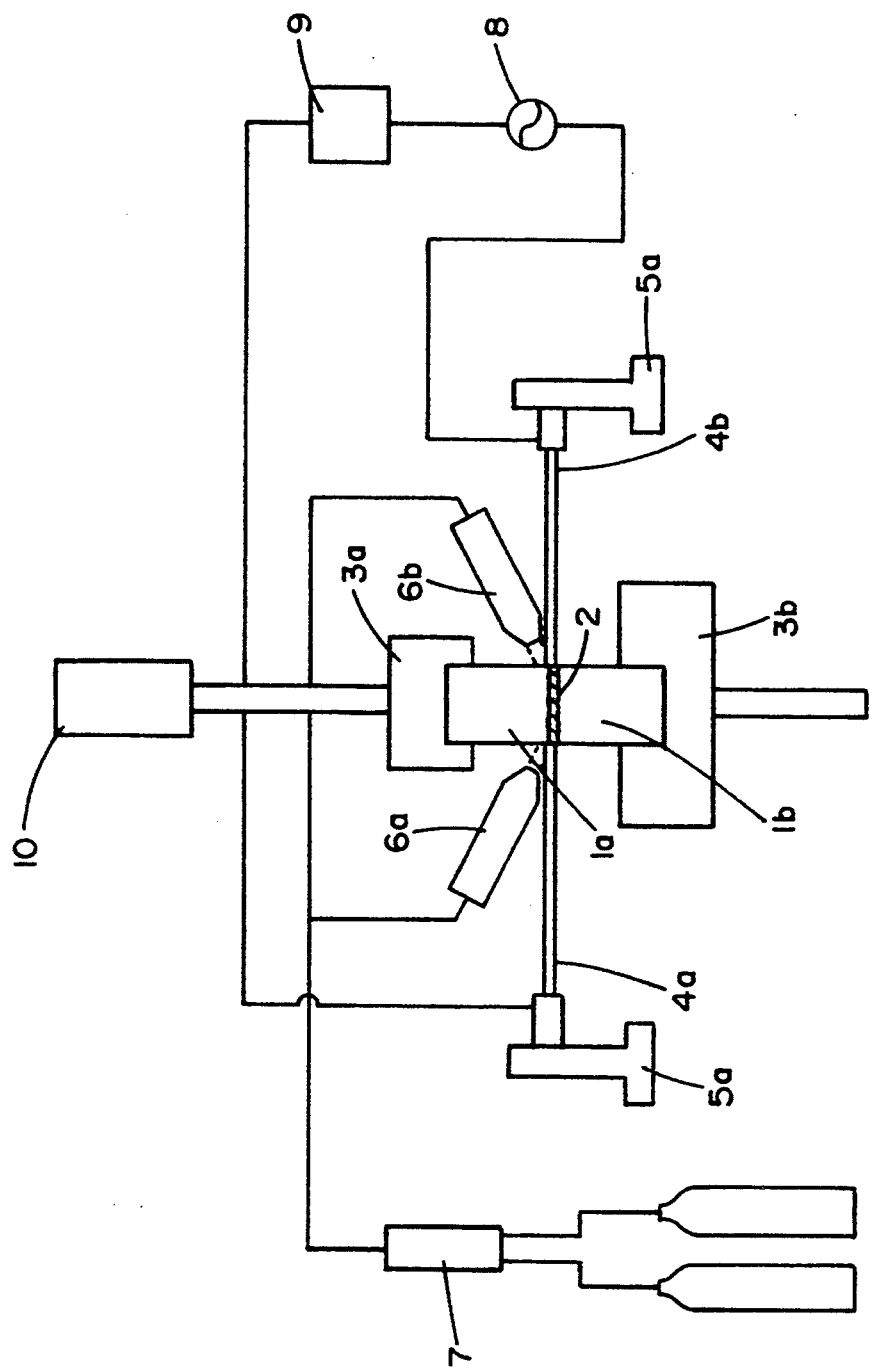
FIG. 2 is a block diagram of the joining apparatus for use in the electric joining method.

FIG. 2 is a block diagram of an electric joining apparatus for use in the embodiment. This apparatus comprises an upper sample holding means (3a) and a lower sample holding means (3b), a pressing and positioning control means (10), a gas flame opening for the pre-heating (6a and 6b), electrodes (4a and 4b), electrode moving means (5a and 5b), an electric power source for heating (8) and various measuring equipments such as voltmeter, ampere meter or pyrometer(9). The electrode is made of tungsten and is in a bar form or plate form. The electric power source is a high voltage electric power source with a drooping characteristic or a high voltage electric power source in a constant current or a constant voltage type and controls the flowing current or electric power in a manual or automatic way.

Ceramic bodies are in a block shape for evaluating the strength and is in a size of 15 mm×15 mm×20 mm (a plane to be jointed 15 mm×15 mm). The roughness of the plane to be jointed is adjusted to be less than 2 μm with Rmax. A joining agent is a mixture of various powders in a given mixing ratio and is of a paste form incorporated with organic binder solved in a solvent such as acetone or toluene. The electric joining method comprises, as a basic process as shown in FIG. 2, the following steps of; applying uniformly the joining agent in a paste form to a surface of ceramic bodies to be jointed by a screen printing method, combining the ceramic bodies at the surface to be jointed and setting the combined ceramic to a holding jig, pre-heating the portion to be jointed to a given temperature with a propane gas flame, applying electric voltage across the electrodes after the temperature reaches the given value so as to permit the electric current to flow through the joining agent, moving reciprocally the electrodes in a bar form along with the planes to be jointed (when the supplying electric current to electrodes are in a plate form, the electrodes are in contact with the planes to be jointed and manage the electric current to flow through all of the planes to be jointed), heating the joining agent up to a given temperature at a given heating rate under controlling the electric current or the electric power, melting the joining agent, carrying out the reaction between the ceramic bodies to be jointed and the joining agent and then cooling, at a given cooling rate, ceramic bodies jointed to each other through the molten joining agent to room temperature to complete the joint. The all steps are carried out in the atmosphere of air. A test piece for strength test (bending test) is in a size of 3 mm ×4 mm×40 mm (JIS size) and is obtained by cutting the ceramic bodies jointed through the joint part in a size of 15 mm×15 mm×40 mm.

$CaF_2$ Joining Agents for Use in Electric Joining Method

The electric joining method is carried out at the following condition: The used joining agent is in an amount of 50 mg/cm$^2$. The pre-heating is carried out up to a temperature of 800° to 900° C. The flowing electric current through the joining agent is 0.6 to 1 A. The electrode is moved at a rate of 5 cm/min to heat all planes to be jointed. The strength test is carried out with the test piece in a JIS form at the following condition by using a four points bending test: An upper span is 10 mm, and a lower span is 30 mm. The cross-head speed is 0.5 mm/min. The testing result is shown by the average value Mpa (mega pascal) obtained with 10 testing pieces subjected to the four points bending test. In the following embodiment, the experimental data and table is described in a collecting manner after description of the invention.

Embodiment 1

In order to confirm the effect of the joining agent according to claim 4, the joining agents are prepared by making the mixing ratio of $CaF_2$ and $Al_2O_3$ shown in Table 1. The resultant joint parts are tested with the strength at a room temperature and 1000° C. This test result indicates that the joining agents including 10 to 40 weight % of $CaF_2$ and 60 to 90 weight % of $Al_2O_3$ (testing piece No. attached with symbol *) are provided with the joining strength more than 210 Mpa from room temperature to 1000° C.

The joining agents are prepared by including $CaF_2$, $Al_2O_3$ and $SiO_2$ in accordance with the mixing ratio shown in Table 2. The resultant joint parts are subjected to the strength test at room temperature and 1000° C. This test result indicates that the joining agents including 10 to 40 weight % of $CaF_2$, more than 10 weight % of $Al_2O_3$ and more than 10 weight % of $SiO_2$ are provided with the joining strength more than 250 Mpa from room temperature to 1000° C.

Embodiment 2

In order to confirm the effect of the joining agent according to claim 5, the joining agents are prepared by making the mixing ratio of $CaF_2$, $Al_2O_3$ and $Y_2O_3$ shown in Table 3. The resultant joint parts are tested with the strength at a room temperature and 1000° C. This test result indicates that the joining agents including 10 to 40 weight % of $CaF_2$, more than 10 weight % of $Al_2O_3$ and 10 to 55 weight % of $Y_2O_3$ are provided with the joining strength more than 300 Mpa from room temperature to 1000° C.

The joining agents are prepared by including $CaF_2$, $Al_2O_3$, $SiO_2$ and $Y_2O_3$ in accordance with the mixing ratio shown in Tables 4-1 to 4-3. The resultant joint parts are subjected to the strength test at room temperature and 1000° C. This test result indicates that the joining agents including 10 to 40 weight % of $CaF_2$, more than 10 weight % of $Al_2O_3$, more than 10 weight % of $SiO_2$ and 10 to 55 weight % of $Y_2O_3$ are provided with the joining strength more than 350 Mpa from room temperature to 1000° C.

Embodiment 3

In order to confirm the effect of the joining agent according to claim 6, the joining agents are prepared by making the mixing ratio of $CaF_2$, $Al_2O_3$ and $Si_3N_4$ shown in Table 5. The resultant joint parts are tested with the strength at a room temperature and 1000° C. This test result indicates that the joining agents including 10 to 40 weight % of $CaF_2$, 15 to 45 weight % of $Si_3N_4$ and the residual of $Al_2O_3$ are provided with the joining strength more than 300 Mpa from room temperature to 1000° C.

The joining agents are prepared by including $CaF_2$, $Al_2O_3$, $SiO_2$ and $Si_3N_4$ in accordance with the mixing ratio shown in Tables 6-1 to 6-3. The resultant joint parts are subjected to the strength test at room temperature and 1000° C. This test result indicates that the joining agents including 10 to 40 weight % of $CaF_2$, more than 10 weight % of $Al_2O_3$, more than 10 weight % of $SiO_2$ and 15 to 45 weight % of $Si_3N_4$ are provided with the joining strength more than 350 Mpa from room temperature to 1000° C.

Embodiment 4

In order to confirm the effect of the joining agent according to claim 7, the joining agent is prepared by making the mixing ratio of 30 weight % of $CaF_2$, 20 weight % of $Al_2O_3$, 25 weight % of $Y_2O_3$ and 25 weight % of $Si_3N_4$. The strength test with the resultant joint part shows 425 Mpa at room temperature and 422 Mpa at 1000° C. The strength test is carried out with the joining agent having a composition of 30 weight % of $CaF_2$, 15 weight % of $Al_2O_3$, 15 weight % of $SiO_2$, 20 weight % of $Y_2O_3$ and 20 weight % of $Si_3N_4$. The strength test with the resultant joint part shows 465 Mpa at room temperature and 470 Mpa at 1000° C.

TABLE 1

| Samples | $CaF_2$ | $Al_2O_3$ | Room Temp | 1000° C. |
|---|---|---|---|---|
| *1 | 0 | 100 | — | — |
| 2 | 5 | 95 | 92 | 101 |
| *3 | 10 | 90 | 230 | 228 |
| *4 | 20 | 80 | 259 | 262 |
| *5 | 30 | 70 | 283 | 288 |
| *6 | 40 | 60 | 265 | 212 |
| 7 | 45 | 55 | 259 | 137 |
| 8 | 50 | 50 | 244 | 71 |

TABLE 2

| Samples | $CaF_2$ | $Al_2O_3$ | $SiO_2$ | Room Temp | 1000° C. |
|---|---|---|---|---|---|
| 1 | 5 | 10 | 85 | 35 | 54 |
| 2 | 5 | 50 | 45 | 61 | 55 |
| 3 | 5 | 85 | 10 | 27 | 19 |
| 4 | 10 | 5 | 85 | 251 | 213 |
| *5 | 10 | 10 | 80 | 262 | 258 |
| *6 | 10 | 45 | 45 | 266 | 271 |
| *7 | 10 | 80 | 10 | 259 | 258 |
| 8 | 10 | 85 | 5 | 208 | 214 |
| 9 | 30 | 5 | 65 | 289 | 230 |
| *10 | 30 | 10 | 60 | 305 | 275 |
| *11 | 30 | 35 | 35 | 319 | 333 |
| *12 | 30 | 60 | 10 | 298 | 296 |
| 13 | 30 | 65 | 5 | 238 | 244 |
| 14 | 40 | 5 | 55 | 263 | 203 |
| *15 | 40 | 10 | 50 | 267 | 255 |
| *16 | 40 | 30 | 30 | 289 | 293 |
| *17 | 40 | 50 | 10 | 301 | 262 |
| 18 | 40 | 55 | 5 | 263 | 219 |

TABLE 2-continued

| Samples | CaF$_2$ | Al$_2$O$_3$ | SiO$_2$ | Room Temp | 1000° C. |
|---|---|---|---|---|---|
| 19 | 45 | 10 | 45 | 278 | 192 |
| 20 | 45 | 25 | 30 | 290 | 195 |
| 21 | 45 | 45 | 10 | 259 | 135 |

TABLE 3

| Samples | CaF$_2$ | Al$_2$O$_3$ | Y$_2$O$_3$ | Room Temp | 1000° C. |
|---|---|---|---|---|---|
| 1 | 5 | 85 | 10 | 38 | 27 |
| 2 | 5 | 60 | 35 | 41 | 61 |
| 3 | 5 | 40 | 55 | 55 | 43 |
| 4 | 10 | 85 | 5 | 265 | 283 |
| *5 | 10 | 80 | 10 | 311 | 324 |
| *6 | 10 | 55 | 35 | 309 | 313 |
| *7 | 10 | 35 | 55 | 317 | 302 |
| 8 | 10 | 30 | 60 | 303 | 215 |
| 9 | 20 | 35 | 45 | 328 | 337 |
| *10 | 20 | 60 | 20 | 331 | 333 |
| *11 | 30 | 65 | 5 | 278 | 292 |
| *12 | 30 | 60 | 10 | 313 | 320 |
| 13 | 30 | 15 | 55 | 322 | 305 |
| 14 | 30 | 10 | 60 | 311 | 223 |
| *15 | 35 | 10 | 55 | 319 | 303 |
| *16 | 40 | 55 | 5 | 278 | 234 |
| *17 | 40 | 50 | 10 | 325 | 310 |
| 18 | 40 | 25 | 35 | 341 | 304 |
| 19 | 40 | 10 | 50 | 326 | 305 |
| 20 | 40 | 5 | 55 | 308 | 244 |
| 21 | 45 | 45 | 10 | 231 | 154 |
| 22 | 45 | 30 | 25 | 313 | 190 |
| 23 | 45 | 10 | 45 | 276 | 145 |

TABLE 4-1

| Sample | CaF$_2$ | Al$_2$O$_3$ | SiO$_2$ | Y$_2$O$_3$ | Room Temp | 1000° C. |
|---|---|---|---|---|---|---|
| 1 | 10 | 5 | 75 | 10 | 249 | 203 |
| 2 | 10 | 5 | 60 | 25 | 285 | 258 |
| 3 | 10 | 5 | 30 | 55 | 280 | 233 |
| 4 | 10 | 10 | 75 | 5 | 320 | 333 |
| *5 | 10 | 10 | 70 | 10 | 358 | 362 |
| *6 | 10 | 10 | 50 | 30 | 365 | 354 |
| *7 | 10 | 10 | 25 | 55 | 367 | 357 |
| 8 | 10 | 10 | 20 | 60 | 341 | 298 |
| 9 | 10 | 25 | 60 | 5 | 289 | 304 |
| *10 | 10 | 25 | 55 | 10 | 372 | 369 |
| *11 | 10 | 25 | 30 | 35 | 358 | 358 |
| *12 | 10 | 25 | 10 | 55 | 362 | 353 |
| *13 | 10 | 40 | 20 | 30 | 363 | 370 |
| *14 | 10 | 40 | 10 | 40 | 372 | 365 |
| 15 | 10 | 40 | 5 | 45 | 330 | 328 |
| *16 | 10 | 55 | 15 | 20 | 363 | 355 |
| *17 | 10 | 70 | 10 | 10 | 358 | 371 |
| 18 | 10 | 75 | 10 | 5 | 308 | 314 |
| 19 | 10 | 75 | 5 | 10 | 305 | 303 |

TABLE 4-2

| Sample | CaF$_2$ | Al$_2$O$_3$ | SiO$_2$ | Y$_2$O$_3$ | Room Temp | 1000° C. |
|---|---|---|---|---|---|---|
| 1 | 30 | 5 | 55 | 10 | 321 | 275 |
| 2 | 30 | 5 | 30 | 35 | 308 | 264 |
| 3 | 30 | 5 | 10 | 55 | 311 | 277 |
| 4 | 30 | 10 | 55 | 5 | 323 | 315 |
| *5 | 30 | 10 | 50 | 10 | 364 | 370 |
| *6 | 30 | 10 | 30 | 30 | 389 | 377 |
| *7 | 30 | 10 | 10 | 50 | 375 | 368 |
| 8 | 30 | 10 | 5 | 55 | 322 | 290 |
| 9 | 30 | 30 | 35 | 5 | 317 | 328 |
| *10 | 30 | 30 | 30 | 10 | 354 | 362 |
| *11 | 30 | 30 | 20 | 20 | 373 | 380 |
| *12 | 30 | 30 | 10 | 30 | 369 | 372 |
| 13 | 30 | 30 | 5 | 35 | 340 | 335 |
| *14 | 30 | 50 | 10 | 10 | 363 | 363 |
| 15 | 30 | 55 | 5 | 10 | 303 | 309 |
| 16 | 30 | 55 | 10 | 5 | 310 | 308 |

TABLE 4-3

| Sample | CaF$_2$ | Al$_2$O$_3$ | SiO$_2$ | Y$_2$O$_3$ | Room Temp | 1000° C. |
|---|---|---|---|---|---|---|
| 1 | 40 | 5 | 10 | 45 | 328 | 300 |
| 2 | 40 | 5 | 25 | 30 | 351 | 282 |
| 3 | 40 | 5 | 45 | 10 | 343 | 275 |
| 4 | 40 | 10 | 5 | 45 | 339 | 351 |
| *5 | 40 | 10 | 10 | 40 | 370 | 354 |
| *6 | 40 | 10 | 25 | 25 | 366 | 354 |
| *7 | 40 | 10 | 40 | 10 | 358 | 362 |
| 8 | 40 | 10 | 45 | 5 | 345 | 322 |
| 9 | 40 | 25 | 5 | 30 | 333 | 319 |
| *10 | 40 | 25 | 10 | 25 | 381 | 358 |
| *11 | 40 | 25 | 20 | 15 | 379 | 380 |
| *12 | 40 | 25 | 25 | 10 | 368 | 363 |
| 13 | 40 | 25 | 30 | 5 | 328 | 332 |
| *14 | 40 | 40 | 10 | 10 | 367 | 353 |
| 15 | 40 | 45 | 5 | 10 | 309 | 303 |
| 16 | 40 | 45 | 10 | 5 | 313 | 321 |

TABLE 5

| Sample | CaF$_2$ | Al$_2$O$_3$ | Si$_3$N$_4$ | Room Temp | 1000° C. |
|---|---|---|---|---|---|
| 1 | 5 | 80 | 15 | 29 | 54 |
| 2 | 5 | 65 | 30 | 57 | 52 |
| 3 | 5 | 50 | 45 | 36 | 23 |
| 4 | 10 | 80 | 10 | 245 | 258 |
| *5 | 10 | 75 | 15 | 310 | 313 |
| *6 | 10 | 60 | 30 | 316 | 323 |
| *7 | 10 | 45 | 45 | 304 | 306 |
| 8 | 10 | 40 | 50 | 284 | 288 |
| *9 | 20 | 65 | 15 | 315 | 320 |
| *10 | 20 | 50 | 30 | 329 | 339 |
| 11 | 20 | 30 | 50 | 260 | 272 |
| 12 | 30 | 60 | 10 | 289 | 276 |
| *13 | 30 | 40 | 30 | 337 | 341 |
| *14 | 30 | 25 | 45 | 318 | 319 |
| 15 | 40 | 50 | 10 | 306 | 222 |
| *16 | 40 | 45 | 15 | 325 | 320 |
| *17 | 40 | 30 | 30 | 323 | 305 |
| *18 | 40 | 15 | 45 | 329 | 311 |
| 19 | 40 | 10 | 50 | 202 | 219 |
| 20 | 45 | 40 | 15 | 269 | 108 |
| 21 | 45 | 25 | 30 | 321 | 133 |
| 22 | 45 | 10 | 45 | 303 | 145 |

TABLE 6-1

| Sample | CaF$_2$ | Al$_2$O$_3$ | SiO$_2$ | Si$_3$N$_4$ | Room Temp | 1000° C. |
|---|---|---|---|---|---|---|
| 1 | 10 | 5 | 70 | 15 | 340 | 316 |
| 2 | 10 | 5 | 50 | 35 | 352 | 310 |
| 3 | 10 | 5 | 35 | 50 | 315 | 312 |
| 4 | 10 | 10 | 70 | 10 | 321 | 304 |
| *5 | 10 | 10 | 65 | 15 | 366 | 358 |
| *6 | 10 | 10 | 45 | 35 | 355 | 360 |
| *7 | 10 | 10 | 20 | 50 | 362 | 361 |
| 8 | 10 | 10 | 25 | 55 | 265 | 259 |
| *9 | 10 | 20 | 20 | 50 | 357 | 366 |
| 10 | 10 | 20 | 15 | 55 | 254 | 262 |
| 11 | 10 | 25 | 10 | 55 | 239 | 244 |
| 12 | 10 | 30 | 50 | 15 | 368 | 370 |
| *13 | 10 | 30 | 45 | 15 | 368 | 370 |
| *14 | 10 | 30 | 25 | 35 | 378 | 369 |
| *15 | 10 | 30 | 10 | 50 | 355 | 361 |
| 16 | 10 | 35 | 5 | 50 | 323 | 334 |
| *17 | 10 | 50 | 20 | 20 | 365 | 362 |
| *18 | 10 | 50 | 10 | 30 | 359 | 362 |
| 19 | 10 | 50 | 5 | 35 | 340 | 351 |
| *20 | 10 | 65 | 10 | 15 | 358 | 355 |
| 21 | 10 | 70 | 10 | 10 | 320 | 313 |
| 22 | 10 | 70 | 5 | 15 | 302 | 316 |

TABLE 6-2

| Sample | CaF$_2$ | Al$_2$O$_3$ | SiO$_2$ | Si$_3$N$_4$ | Room Temp | 1000° C. |
|---|---|---|---|---|---|---|
| 1 | 30 | 5 | 50 | 15 | 343 | 299 |
| 2 | 30 | 5 | 35 | 30 | 352 | 316 |
| 3 | 30 | 5 | 20 | 45 | 333 | 304 |
| 4 | 30 | 10 | 50 | 10 | 325 | 313 |

TABLE 6-2-continued

| Sample | CaF$_2$ | Al$_2$O$_3$ | SiO$_2$ | Si$_3$N$_4$ | Room Temp | 1000° C. |
| --- | --- | --- | --- | --- | --- | --- |
| *5 | 30 | 10 | 45 | 15 | 370 | 370 |
| *6 | 30 | 10 | 30 | 30 | 367 | 358 |
| *7 | 30 | 10 | 15 | 45 | 359 | 365 |
| 8 | 30 | 10 | 10 | 50 | 258 | 243 |
| *9 | 30 | 15 | 10 | 45 | 360 | 358 |
| 10 | 20 | 20 | 5 | 45 | 303 | 300 |
| 11 | 30 | 30 | 30 | 10 | 321 | 304 |
| *12 | 30 | 30 | 25 | 15 | 376 | 378 |
| *13 | 30 | 30 | 20 | 20 | 382 | 373 |
| *14 | 30 | 30 | 10 | 30 | 380 | 377 |
| 15 | 30 | 30 | 5 | 35 | 310 | 306 |
| *16 | 30 | 45 | 10 | 15 | 365 | 368 |
| 17 | 30 | 50 | 10 | 10 | 325 | 331 |
| 18 | 30 | 50 | 5 | 15 | 330 | 323 |

TABLE 6-3

| Sample | CaF$_2$ | Al$_2$O$_3$ | SiO$_2$ | Si$_3$N$_4$ | Room Temp | 1000° C. |
| --- | --- | --- | --- | --- | --- | --- |
| 1 | 40 | 5 | 40 | 15 | 344 | 306 |
| 2 | 40 | 5 | 25 | 30 | 352 | 327 |
| 3 | 40 | 5 | 10 | 45 | 355 | 310 |
| 4 | 40 | 10 | 40 | 10 | 343 | 306 |
| *5 | 40 | 10 | 35 | 15 | 364 | 366 |
| *6 | 40 | 10 | 20 | 30 | 383 | 373 |
| *7 | 40 | 10 | 10 | 40 | 360 | 359 |
| 8 | 40 | 10 | 5 | 45 | 327 | 339 |
| 9 | 40 | 25 | 25 | 10 | 354 | 322 |
| *10 | 40 | 25 | 20 | 15 | 354 | 351 |
| *11 | 40 | 25 | 15 | 20 | 374 | 350 |
| *12 | 40 | 25 | 10 | 25 | 362 | 355 |
| 13 | 40 | 25 | 5 | 30 | 341 | 339 |
| *14 | 40 | 35 | 10 | 15 | 359 | 355 |
| 15 | 40 | 40 | 10 | 10 | 323 | 308 |
| 16 | 40 | 40 | 5 | 15 | 333 | 315 |

The joining agents of the above embodiments are applied for the silicon nitride ceramics having a high heat resistance. However, the joining agents according to the present invention are applicable for ceramics including silicon nitride component such as sialon ceramics.

Further, the joining agents according to the present invention can be prepared by using the compound of alumina Al$_2$O$_3$ and silica SiO$_2$ such as kaolinite (Al$_2$O$_3$. 2 SiO$_2$. 2 H$_2$O) and mullite (3 Al$_2$O$_3$. 2 SiO$_2$) in place of a mixture of individual alumina and silica.

In such a way, the joining agents according to the present invention include, as an electric conductive component, CaF$_2$ and achieve the joint strength practically usable at high temperature and are very suitable for joining the ceramic body having a high heat resistance.

NaF Joining Agents for Use in an Electric Joining Method

The following description is directed to the embodiment of claim 8.

The electric joining method is carried out at the following condition: The used joining agent is in an amount of 50 mg/cm$^2$. The pre-heating is carried out up to a temperature of 850° to 900° C. The joining agent at the joint of ceramic bodies is heated uniformly at all of the joint by an electric current of 0.3 to 2 A. The strength test is carried out in a similar way to that of the joining agent of CaF$_2$ system. It is noted that the experiment data are collectively described at a place behind of the detailed description of the invention.

Embodiment 5

In order to confirm the effect of the joining agent according to claim 8, the joining agents are prepared by using the mixing ratio of NaF and SiO$_2$ shown in Table 7. The resultant joint parts are tested with the strength at a room temperature and 600° C. This test result indicates that the joining agents including 5 to 20 weight % of NaF, 80 to 95 weight % of SiO$_2$ (indicated by *) are provided with the joining strength more than 100 Mpa from room temperature to 600° C.

The joining agents are prepared by including NaF, Al$_2$O$_3$, and SiO$_2$ in accordance with the mixing ratio shown in Table 8. The resultant joint parts are subjected to the strength test at room temperature and 600° C. This embodiment indicates that the joining agents including 5 to 20 weight % of NaF, 20 to 60 weight % of Al$_2$O$_3$, and 30 to 70 weight % of SiO$_2$ (range having the sample number attached with a symbol *) are provided with the joining strength more than 150 Mpa from room temperature to 600° C.

The joining agents are prepared by including NaF, Al$_2$O$_3$, SiO$_2$ and MgO in accordance with the mixing ratio shown in Tables 9-1 to 9-3. The resultant joint parts are subjected to the strength test at room temperature and 600° C. This test result indicates that the joining agents including 5 to 20 weight % of NaF, 20 to 60 weight % of Al$_2$O$_3$, 30 to 70 weight % of SiO$_2$ and 2.5 to 10 weight % of MgO are provided with the joining strength more than 230 Mpa from room temperature to 600° C.

It is noted that Table 10 to 12 indicate the joint part strength at a room temperature and 600° C. with the joining agents including NaF, Al$_2$O$_3$, SiO$_2$ and the residual of at least one element selected from the group consisting of MgO, Y$_2$O$_3$ and TiO$_2$ in a mixing ratio shown in Table 10 to 12.

TABLE 7

| Samples | NaF | SiO$_2$ | Room Temp | 600° C. |
| --- | --- | --- | --- | --- |
| 1 | 60 | 40 | 86 | 12 |
| 2 | 50 | 50 | 127 | 56 |
| 3 | 30 | 70 | 146 | 79 |
| *4 | 20 | 80 | 208 | 104 |
| *5 | 10 | 90 | 217 | 122 |
| *6 | 5 | 95 | 202 | 113 |
| 7 | 3 | 97 | — | — |

TABLE 8

| Sample | NaF | Al$_2$O$_3$ | SiO$_2$ | Room Temp. | 600° C. |
| --- | --- | --- | --- | --- | --- |
| 1 | 50 | 20 | 30 | — | — |
| 2 | 30 | 40 | 30 | 165 | 98 |
| 3 | 30 | 20 | 50 | 172 | 74 |
| 4 | 20 | 60 | 20 | 158 | 131 |
| *5 | 20 | 50 | 30 | 227 | 157 |
| *6 | 20 | 30 | 50 | 221 | 163 |
| *7 | 20 | 20 | 60 | 223 | 151 |
| 8 | 20 | 10 | 70 | 196 | 119 |
| 9 | 10 | 70 | 20 | — | — |
| *10 | 10 | 60 | 30 | 238 | 210 |
| *11 | 10 | 40 | 50 | 226 | 206 |
| *12 | 10 | 20 | 70 | 229 | 151 |
| 13 | 10 | 10 | 80 | 212 | 108 |
| 14 | 5 | 65 | 30 | 153 | 162 |
| *15 | 5 | 60 | 35 | 233 | 213 |
| *16 | 5 | 42 | 53 | 235 | 202 |
| *17 | 5 | 25 | 70 | 216 | 162 |
| 18 | 5 | 20 | 75 | 201 | 133 |
| 19 | 3 | 60 | 37 | — | — |
| 20 | 3 | 47 | 50 | 38 | 42 |
| 21 | 3 | 27 | 70 | — | — |

TABLE 9-1

| Sample | NaF | Al₂O₃ | SiO₂ | MgO | Room Temp | 600° C. |
|---|---|---|---|---|---|---|
| *1 | 5 | 60 | 32.5 | 2.5 | 256 | 233 |
| *2 | 5 | 50 | 40 | 5 | 277 | 241 |
| *3 | 5 | 50 | 35 | 10 | 252 | 238 |
| 4 | 5 | 50 | 30 | 15 | 249 | 202 |
| *5 | 5 | 40 | 52.5 | 2.5 | 263 | 235 |
| *6 | 5 | 40 | 50 | 5 | 271 | 253 |
| *7 | 5 | 40 | 47.5 | 7.5 | 283 | 246 |
| *8 | 5 | 40 | 45 | 10 | 259 | 234 |
| 9 | 5 | 40 | 40 | 15 | 251 | 193 |
| 10 | 5 | 40 | 35 | 20 | 238 | 186 |
| *11 | 5 | 30 | 60 | 5 | 256 | 232 |
| *12 | 5 | 30 | 57.5 | 7.5 | 261 | 240 |
| *13 | 5 | 20 | 70 | 5 | 250 | 237 |
| *14 | 5 | 20 | 67.5 | 7.5 | 253 | 239 |
| *15 | 5 | 20 | 65 | 10 | 257 | 241 |
| 16 | 5 | 35 | 54.5 | 2.5 | — | — |
| 17 | 3 | 35 | 57 | 5 | — | — |
| 18 | 3 | 30 | 57 | 10 | 68 | 42 |

TABLE 9-2

| Sample | NaF | Al₂O₃ | SiO₂ | MgO | Room Temp | 600° C. |
|---|---|---|---|---|---|---|
| 1 | 10 | 70 | 15 | 5 | 68 | 52 |
| 2 | 10 | 60 | 25 | 5 | 123 | 89 |
| 3 | 10 | 60 | 20 | 10 | 137 | 121 |
| *4 | 10 | 50 | 37.5 | 2.5 | 251 | 233 |
| *5 | 10 | 50 | 35 | 5 | 283 | 239 |
| *6 | 10 | 40 | 45 | 5 | 296 | 242 |
| *7 | 10 | 30 | 57.5 | 2.5 | 258 | 233 |
| *8 | 10 | 30 | 55 | 5 | 273 | 241 |
| *9 | 10 | 30 | 50 | 10 | 264 | 238 |
| 10 | 10 | 30 | 45 | 15 | 252 | 218 |
| 11 | 10 | 30 | 40 | 20 | 238 | 193 |
| 12 | 10 | 30 | 30 | 30 | 216 | 166 |
| *13 | 10 | 20 | 67.5 | 2.5 | 252 | 238 |
| *14 | 10 | 20 | 65 | 5 | 258 | 242 |
| *15 | 10 | 20 | 62.5 | 7.5 | 261 | 231 |
| *16 | 10 | 20 | 60 | 10 | 252 | 237 |
| 17 | 10 | 20 | 55 | 15 | 233 | 162 |
| 18 | 10 | 20 | 50 | 20 | 207 | 153 |
| 19 | 10 | 10 | 75 | 5 | — | — |
| 20 | 10 | 10 | 70 | 10 | 186 | 91 |

TABLE 9-3

| Sample | NaF | Al₂O₃ | SiO₂ | MgO | Room Temp | 600° C. |
|---|---|---|---|---|---|---|
| 1 | 30 | 25 | 40 | 5 | 172 | 146 |
| 2 | 30 | 30 | 30 | 10 | 204 | 168 |
| *3 | 20 | 40 | 37.5 | 2.5 | 257 | 233 |
| *4 | 20 | 40 | 35 | 5 | 278 | 248 |
| *5 | 20 | 40 | 30 | 10 | 269 | 252 |
| *6 | 20 | 35 | 40 | 5 | 258 | 233 |
| *7 | 20 | 35 | 37.5 | 7.5 | 261 | 241 |
| *8 | 20 | 30 | 47.5 | 2.5 | 256 | 237 |
| *9 | 20 | 30 | 45 | 5 | 283 | 242 |
| *10 | 20 | 30 | 42.5 | 7.5 | 271 | 238 |
| *11 | 20 | 30 | 40 | 10 | 284 | 230 |
| 12 | 20 | 30 | 35 | 15 | 258 | 212 |
| *13 | 20 | 20 | 55 | 5 | 269 | 241 |
| *14 | 20 | 20 | 50 | 10 | 253 | 236 |
| 15 | 20 | 20 | 40 | 20 | 241 | 176 |

TABLE 10

| Sample | NaF | Al₂O₃ | SiO₂ | TiO₂ | Room Temp | 600° C. |
|---|---|---|---|---|---|---|
| 1 | 3 | 35 | 57 | 5 | — | — |
| 2 | 3 | 40 | 52 | 5 | — | — |
| *3 | 5 | 40 | 50 | 5 | 268 | 255 |
| 4 | 5 | 40 | 40 | 15 | 248 | 189 |
| *5 | 5 | 35 | 57.5 | 2.5 | 276 | 257 |
| *6 | 5 | 20 | 67.5 | 7.5 | 253 | 235 |
| *7 | 10 | 50 | 37.5 | 2.5 | 249 | 244 |
| *8 | 10 | 40 | 45 | 5 | 283 | 247 |
| *9 | 10 | 30 | 50 | 10 | 261 | 242 |
| 10 | 10 | 30 | 45 | 15 | 239 | 222 |
| *11 | 10 | 20 | 67.5 | 2.5 | 268 | 245 |
| *12 | 20 | 40 | 35 | 5 | 275 | 250 |
| *13 | 20 | 40 | 30 | 10 | 268 | 253 |
| 14 | 20 | 30 | 35 | 15 | 253 | 208 |
| *15 | 20 | 20 | 50 | 10 | 253 | 240 |
| 16 | 25 | 40 | 25 | 10 | 259 | 210 |
| 17 | 25 | 30 | 40 | 5 | 250 | 205 |
| 18 | 25 | 20 | 50 | 5 | 238 | 193 |
| 19 | 30 | 40 | 25 | 5 | 215 | 145 |
| 20 | 30 | 30 | 35 | 5 | 211 | 160 |

TABLE 11

| Sample | NaF | Al₂O₃ | SiO₂ | Y₂O₃ | Room Temp | 600° C. |
|---|---|---|---|---|---|---|
| 1 | 3 | 35 | 57 | 5 | — | — |
| 2 | 3 | 40 | 25 | 5 | — | — |
| 3 | 5 | 50 | 30 | 15 | 245 | 210 |
| *4 | 5 | 40 | 52.5 | 2.5 | 259 | 241 |
| *5 | 5 | 30 | 57.5 | 7.5 | 270 | 253 |
| *6 | 5 | 20 | 70 | 5 | 290 | 245 |
| *7 | 10 | 50 | 35 | 5 | 290 | 245 |
| *8 | 10 | 30 | 57.5 | 2.5 | 249 | 240 |
| *9 | 10 | 30 | 55 | 5 | 271 | 247 |
| 10 | 10 | 30 | 45 | 15 | 255 | 210 |
| *11 | 10 | 20 | 62.5 | 7.5 | 274 | 242 |
| *12 | 20 | 40 | 37.5 | 2.5 | 255 | 240 |
| *13 | 20 | 35 | 40 | 5 | 276 | 245 |
| *14 | 20 | 30 | 45 | 5 | 276 | 245 |
| *15 | 20 | 20 | 55 | 5 | 264 | 250 |
| 15 | 25 | 40 | 30 | 5 | 231 | 173 |
| 17 | 25 | 30 | 35 | 10 | 240 | 191 |
| 18 | 25 | 20 | 50 | 5 | 228 | 200 |
| 19 | 30 | 30 | 35 | 5 | 220 | 130 |
| 20 | 30 | 25 | 40 | 5 | 222 | 158 |

TABLE 12

| Sample | NaF | Al₂O₃ | SiO₂ | Y₂O₃ | MgO | TiO₂ | Room Temp | 600° C. |
|---|---|---|---|---|---|---|---|---|
| *1 | 5 | 50 | 35 | 2.5 | 5 | 2.5 | 245 | 251 |
| *2 | 10 | 45 | 40 | 5 | 2.5 | 2.5 | 292 | 242 |
| *3 | 10 | 35 | 45 | 2.5 | 2.5 | 5 | 288 | 246 |
| *4 | 10 | 30 | 50 | 5 | 2.5 | 2.5 | 285 | 236 |
| *5 | 10 | 35 | 45 | 5 | 5 | 0 | 279 | 261 |
| *6 | 10 | 35 | 45 | 0 | 5 | 5 | 284 | 270 |
| *7 | 10 | 35 | 45 | 5 | 0 | 5 | 265 | 270 |
| *8 | 20 | 40 | 30 | 5 | 5 | 0 | 265 | 252 |
| *9 | 20 | 40 | 30 | 2.5 | 5 | 2.5 | 266 | 244 |
| 10 | 30 | 25 | 35 | 5 | 5 | 0 | 185 | 141 |
| 11 | 30 | 25 | 35 | 2.5 | 2.5 | 5 | 193 | 162 |

In the above embodiment, the joining agents according to the present invention are applied for alumina ceramic but are applicable for any other oxide ceramics such as mullite ceramic.

Further, the joining agents according to the present invention can be prepared by using the compound of alumina and silica such as kaolinite (Al₂O₃ · 2 SiO₂ · 2 H₂O) and mullite (3 Al₂O₃ · 2 SiO₂) in place of a mixture of individual alumina and silica.

In order to give the joining agents according to the present invention another effect or improved effect, it is possible to add the various additives besides NaF, Al₂O₃, SiO₂, MgO, Y₂O₃, and TiO₂ into the joining agents according to the present invention. For example, the joining agents according to the present invention can have nitride such as Si₃N₄ or AlN and carbide such as SiC or TiN incorporated therein in order to include N or C in the glass of the joint layer. Various properties of the joint layer are improved by the formation of oxynitride glass or oxycarbide glass.

In such way, the joining agents according to the present invention include, as an electric conductive component, NaF and achieve the joint part having a stable strength practically usable at room temperature and high temperature and being superior in the sealing property without damaging the mother material are very suitable for joining the oxide ceramics.

Joining Agents of Rare Earth Element Fluoride System for Use in an Electric Joining Method The following description is directed to the embodiment to confirm the effect of claim 9.

Embodiment 6

An joining agent used is composed of a mixture of 60 weight % of $YF_3$, 20 weight % of $Al_2O_3$ and 20 weight % of $SiO_2$ and is of a paste form incorporated with organic binder solved in a solvent such as acetone or toluene. A test piece for strength test is prepared by the jointed silicon nitride ceramic body obtained by joining a couple of silicon nitride ceramic square bars in a size of 15 mm×15 mm×20 mm with the joining agent in an amount of 50 mg/cm². The silicon nitride ceramic bodies with the joining agent is heated by an electric current of 0.6 to 1.0 A for 5 to 10 min under moving the electrode at a rate of 5 cm/min.

A ceramic square bar sample in a size of 3 mm×4 mm×40 mm is obtained by cutting the jointed ceramic bodies. The strength test is carried out with the test piece at the following condition by using a three points bending test: An lower span is 30 mm, and the crosshead speed is 0.5 mm/min. The testing result is shown by the average value Mpa (mega pascal) obtained with three testing pieces. The resultant strength is 420 Mpa at room temperature and is kept nearly to 420 MPa at 1050° C. as shown in Table 13.

TABLE 13

| Main Ingredient | Room Temperature | 1000° C. | Unit: MPa 1050° C. |
|---|---|---|---|
| (Conventonal) CaF—$Al_2O_3$—$SiO_2$ | 400 | 350 | 35 |
| (Invention) $Y_2O_3$—$Al_2O_3$—$SiO_2$ | 421 | 419 | 413 |

Embodiment 7

A joining agent used here is composed of a mixture of 50 weight % of $ScF_3$, 25 weight % of $Al_2O_3$ and 25 weight % of $SiO_2$ and the resultant joint part is subjected to the strength test in a similar way to that of Embodiment 6. As shown in Table 14, the result shows a strength of 416 MPa which is kept up to 1050° C.

TABLE 14

| Main Ingredient | Room Temperature | 1000° C. | Unit: MPa 1050° C. |
|---|---|---|---|
| (Conventonal) CaF—$Al_2O_3$—$SiO_2$ | 400 | 350 | 35 |
| (Invention) $ScF_3$—$Al_2O_3$—$SiO_2$ | 421 | 419 | 413 |

The joining agents of the above embodiment are applied for the silicon nitride ceramics having a high heat resistance. However, the joining agents according to the present invention are applicable for oxide ceramics such as $Al_2O_3$ or $ZrO_2$ and non-oxide ceramics such as sialon ceramic.

Further, the joining agents according to the present invention can be prepared by using the compound of alumina and silica such as kaolinite ($Al_2O_3$. 2 $SiO_2$. 2 $H_2O$) and mullite (3 $Al_2O_3$. 2 $SiO_2$) in place of a mixture of individual alumina and silica.

In order to give the joining agents according to the present invention another effect or improved effect, it is possible to add the various additives besides rare earth metal fluoride, $Al_2O_3$, and $SiO_2$, into the joining agents according to the present invention. For example, the joining agents according to the present invention can have nitride such as $Si_3N_4$ or AlN and carbide such as SiC or TiN incorporated therein in order to include N or C in the glass of the joint layer. Various properties of the joint layer are improved by the formation of oxynitride glass or oxycarbide glass.

In such way, the joining agents according to the present invention include, as a main ingredient, fluoride of the IIIA group element and $Al_2O_3$ and/or $SiO_2$ and achieve the joint part having a stable strength practically usable at room temperature and high temperature and being superior in the corrosion resistance to acid solution and alkali solution.

Joining Agents of Alkaline Earth Element Oxide System for Use in an Electric Joining Method The electric joining method and the joint part strength evaluation method are carried out in a similar way to that of the joining agents of $CaF_2$ system.

Embodiment 8

In order to confirm the effect of the joining agent according to claim 10, the joining agents are prepared by using the mixing ratio shown in Tables 15 to 20. Referring to Table, the experiment result is described.

The joining agents are prepared by including CaO and $Al_2O_3$ in accordance with the mixing ratio shown in Table 15. The resultant joint parts are subjected to the strength test at room temperature, 900° C. and 1000° C. This test result indicates that the joining agents including 15 to 50 weight % of CaO and 50 to 85 weight % of $Al_2O_3$ are provided with the joining strength more than 200 Mpa from room temperature to 1000° C.

The joining agents are prepared by including CaO, $Al_2O_3$, and $SiO_2$ in accordance with the mixing ratio shown in Table 16. The resultant joint parts are subjected to the strength test at room temperature, 900° C. and 1000° C. This test result indicates that the joining agents including 15 to 50 weight % of CaO, more than 10 weight % of $Al_2O_3$, and more than 10 weight % of $SiO_2$ are provided with the joint part strength more than 250 Mpa from room temperature to 1000° C.

The joining agents are prepared by including CaO, $Al_2O_3$, and $Y_2O_3$ in accordance with the mixing ratio shown in Table 17. The resultant joint parts are subjected to the strength test at room temperature and 1000° C. This embodiment indicates that the joining agents including 15 to 50 weight % of CaO, more than 10 weight % of $Al_2O_3$, and 10 to 55 weight % of $Y_2O_3$ are provided with the joint part strength more than 300 Mpa from room temperature to 1000° C.

The joining agents are prepared by including CaO, $Al_2O_3$, $SiO_2$ and $Y_2O_3$ in accordance with the mixing ratio shown in Tables 18-1 to 18-3. The resultant joint parts are subjected to the strength test at room temperature and 1000° C. This test result indicates that the joining agents including 15 to 50 weight % of CaO, more than 10 weight % of $Al_2O_3$, more than 10 weight % of $SiO_2$ and 10 to 55 weight % of $Y_2O_3$ are provided with the joint part strength more than 350 Mpa from room temperature to 1000° C.

The joining agents are prepared by including CaO, $Al_2O_3$, and $Si_3N_4$ in accordance with the mixing ratio shown in Table 19. The resultant joint parts are subjected to the strength test at room temperature and 1000° C. This embodiment indicates that the joining agents including 15 to 50 weight % of CaO, 15 to 45 weight % of $Si_3N_4$ and the residual of $Al_2O_3$ are provided with the joint part strength more than 300 Mpa from room temperature to 1000° C.

The joining agents are prepared by including CaO, $Al_2O_3$, $SiO_2$ and $Si_3N_4$ in accordance with the mixing ratio shown in Tables 20-1 to 20-3. The resultant joint parts are subjected to the strength test at room temperature and 1000° C. This test result indicates that the joining agents including 15 to 50 weight % of CaO, more than 10 weight % of $Al_2O_3$, more than 10 weight % of $SiO_2$ and 15 to 45 weight % of $Si_3N_4$ are provided with the joint part strength more than 350 Mpa from room temperature to 1000° C.

The embodiment indicates that the joining agent including 30 weight % of CaO, 20 weight % of $Al_2O_3$, 25 weight % of $Y_2O_3$ and 25 weight % of $Si_3N_4$ is provided with the joint part strength of 430 Mpa at room temperature and 420 MPa at 1000° C.

The embodiment indicates that the joining agent including 30 weight % of CaO, 15 weight % of $Al_2O_3$, is weight % of $SiO_2$, 20 weight % of $Y_2O_3$ and 20 weight % of $Si_3N_4$ is provided with the joint part strength of 459 Mpa at room temperature and 465 MPa at 1000° C.

Embodiment 9

In order to confirm the effect of the joining agent according to claim 11, the joining agents are prepared by using the mixing ratio shown in Tables 21 to 26. Referring to Table, the experiment result is described.

The joining agents are prepared by including MgO and $Al_2O_3$ in accordance with the mixing ratio shown in Table 21. The resultant joint parts are subjected to the strength test at room temperature and 900° C. This test result indicates that the joining agents including 10 to 45 weight % of MgO and 55 to 90 weight % of $Al_2O_3$ are provided with the joining strength more than 250 Mpa from room temperature to 900° C.

The joining agents are prepared by including MgO, $Al_2O_3$, and $SiO_2$ in accordance with the mixing ratio shown in Table 22. The resultant joint parts are subjected to the strength test at room temperature and 900° C. This test result indicates that the joining agents including 10 to 45 weight % of MgO, more than 10 weight % of $Al_2O_3$, and more than 10 weight % of $SiO_2$ are provided with the joint part strength more than 300 Mpa from room temperature to 900° C.

The joining agents are prepared by including MgO, $Al_2O_3$, and $Y_2O_3$ in accordance with the mixing ratio shown in Table 23. The resultant joint parts are subjected to the strength test at room temperature and 900° C. This test result indicates that the joining agents including 10 to 45 weight % of MgO, more than 10 weight % of $Al_2O_3$, and 10 to 55 weight % of $Y_2O_3$ are provided with the joint part strength more than 300 Mpa from room temperature to 900° C.

The joining agents are prepared by including MgO, $Al_2O_3$, $SiO_2$ and $Y_2O_3$ in accordance with the mixing ratio shown in Tables 24-1 to 24-3. The resultant joint parts are subjected to the strength test at room temperature and 900° C. This test result-indicates that the joining agents including 10 to 45 weight % of MgO, more than 10 weight % of $Al_2O_3$, more than 10 weight % of $SiO_2$ and 10 to 55 weight % of $Y_2O_3$ are prepared with the joint part strength more than 350 Mpa from room temperature to 900° C.

The joining agents are prepared by including MgO, $Al_2O_3$, and $Si_3N_4$ in accordance with the mixing ratio shown in Table 25. The resultant joint parts are subjected to the strength test at room temperature and 1000° C. This test result indicates that the joining agents including 10 to 45 weight % of MgO, 15 to 45 weight % of $Si_3N_4$ and the residual of $Al_2O_3$ are provided with the joint part strength more than 300 Mpa from room temperature to 900° C.

The joining agents are prepared by including MgO, $Al_2O_3$, $SiO_2$ and $Si_3N_4$ in accordance with the mixing ratio shown in Tables 26-1 to 26-3. The resultant joint parts are subjected to the strength test at room temperature and 900° C. This test result indicates that the joining agents including 10 to 45 weight % of MgO, more than 10 weight % of $Al_2O_3$, more than 10 weight % of $SiO_2$ and 15 to 45 weight % of $Si_3N_4$ are provided with the joint part strength more than 350 Mpa from room temperature to 900° C.

The embodiment indicates that the joining agent including 30 weight % of MgO, 20 weight % of $Al_2O_3$, 25 weight % of $Y_2O_3$ and 25 weight % of $Si_3N_4$ is provided with the joint part strength of 415 Mpa at room temperature and 430 MPa at 900° C.

The embodiment indicates that the joining agent including 30 weight % of MgO, 15 weight % of $Al_2O_3$, 15 weight % of $SiO_2$, 20 weight % of $Y_2O_3$ and 20 weight % of $Si_3N_4$ is provided with the joint part strength of 465 Mpa at room temperature and 455 MPa at 900° C.

Embodiment 10

In order to confirm the effect of the joining agent according to claim 12, the joining agents are prepared by using a mixture of MgO and a transition metal oxide in the mixing ratio shown in Tables 27 to 31 and the resultant joint parts are subjected to the strength test at room temperature and 900° C. It is found that the joining agents of this embodiment are provided with the strength higher than 200 MPa from room temperature to 900° C.

The joining agents including MgO and the transient metal oxide are clearly improved in the joint part strength by adding $Si_3N_4$ and $Y_2O_3$. For example, a joining agent comprising 50 weight % of MgO, 25 weight % of MnO, and 25 weight % of $Y_2O_3$ is provided with the joining strength of 315 MPa at room temperature and 321 MPa at 900° C. A joining agent comprising 45 weight % of MgO, 30 weight % of MnO, and 25 weight % of $Si_3N_4$ is provided with the joining strength of 308 MPa at room temperature and 310 MPa at 900° C.

TABLE 15

| Sample | CaO | $Al_2O_3$ | Room Temp | 900° C. | 1000° C. |
|---|---|---|---|---|---|
| 1 | 10 | 90 | — | — | — |
| 2 | 15 | 85 | 272 | 251 | 263 |
| 3 | 30 | 70 | 282 | 279 | 281 |
| 4 | 40 | 60 | 290 | 253 | 235 |
| 5 | 50 | 50 | 273 | 248 | 231 |
| 6 | 55 | 45 | 281 | 211 | 111 |
| 7 | 100 | 0 | 275 | 92 | 9 |

TABLE 16

| Sample | CaO | Al₂O₃ | SiO₂ | Room Temp | 900° C. | 1000° C. |
|---|---|---|---|---|---|---|
| 1 | 10 | 45 | 45 | — | — | — |
| 2 | 15 | 5 | 80 | 291 | 171 | 83 |
| 3 | 15 | 10 | 75 | 343 | 337 | 259 |
| 4 | 15 | 47.5 | 47.5 | 335 | 325 | 311 |
| 5 | 15 | 75 | 10 | 325 | 331 | 328 |
| 6 | 15 | 80 | 5 | 285 | 263 | 271 |
| 7 | 30 | 35 | 35 | 341 | 351 | 354 |
| 8 | 50 | 5 | 45 | 333 | 143 | 81 |
| 9 | 50 | 10 | 40 | 329 | 301 | 255 |
| 10 | 50 | 25 | 25 | 337 | 309 | 263 |
| 11 | 50 | 40 | 10 | 316 | 305 | 292 |
| 12 | 50 | 45 | 5 | 279 | 272 | 281 |
| 13 | 55 | 10 | 35 | 342 | 154 | 68 |
| 14 | 55 | 22.5 | 22.5 | 339 | 166 | 69 |
| 15 | 55 | 35 | 10 | 318 | 205 | 101 |

TABLE 17

| Sample | CaO | Al₂O₃ | Y₂O₃ | Room Temp | 1000° C. |
|---|---|---|---|---|---|
| 1 | 10 | 80 | 10 | — | — |
| 2 | 10 | 60 | 30 | — | — |
| 3 | 10 | 35 | 55 | — | — |
| 4 | 15 | 80 | 5 | 263 | 269 |
| 5 | 15 | 75 | 10 | 329 | 325 |
| 6 | 15 | 50 | 35 | 340 | 333 |
| 7 | 15 | 30 | 55 | 340 | 320 |
| 8 | 15 | 25 | 60 | 336 | 284 |
| 9 | 25 | 25 | 50 | 342 | 339 |
| 10 | 35 | 35 | 30 | 339 | 335 |
| 11 | 35 | 10 | 55 | 341 | 317 |
| 12 | 45 | 30 | 25 | 343 | 321 |
| 13 | 50 | 45 | 5 | 265 | 258 |
| 14 | 50 | 40 | 10 | 321 | 321 |
| 15 | 50 | 25 | 25 | 328 | 319 |
| 16 | 50 | 10 | 40 | 333 | 315 |
| 17 | 50 | 5 | 45 | 331 | 273 |
| 18 | 55 | 35 | 10 | 315 | 250 |
| 19 | 55 | 20 | 25 | 327 | 235 |
| 20 | 55 | 10 | 35 | 329 | 265 |

TABLE 18-1

| Sample | CaO | Al₂O₃ | SiO₂ | Y₂O₃ | Room Temp | 1000° C. |
|---|---|---|---|---|---|---|
| 1 | 15 | 5 | 10 | 70 | 375 | 265 |
| 2 | 15 | 5 | 40 | 40 | 381 | 278 |
| 3 | 15 | 5 | 70 | 10 | 355 | 286 |
| 4 | 15 | 10 | 5 | 70 | 349 | 299 |
| 5 | 15 | 10 | 10 | 65 | 388 | 365 |
| 6 | 15 | 10 | 40 | 35 | 375 | 371 |
| 7 | 15 | 10 | 65 | 10 | 363 | 358 |
| 8 | 15 | 10 | 70 | 5 | 325 | 295 |
| 9 | 15 | 20 | 10 | 55 | 383 | 372 |
| 10 | 15 | 20 | 30 | 35 | 392 | 395 |
| 11 | 15 | 40 | 20 | 25 | 388 | 392 |
| 12 | 15 | 60 | 15 | 15 | 376 | 383 |
| 13 | 15 | 65 | 5 | 15 | 333 | 335 |
| 14 | 15 | 65 | 10 | 10 | 366 | 368 |
| 15 | 15 | 65 | 15 | 5 | 344 | 337 |
| 16 | 15 | 70 | 7.5 | 7.5 | 328 | 322 |

TABLE 18-2

| Sample | CaO | Al₂O₃ | SiO₂ | Y₂O₃ | Room Temp | 1000° C. |
|---|---|---|---|---|---|---|
| 1 | 30 | 5 | 10 | 55 | 371 | 269 |
| 2 | 30 | 5 | 35 | 30 | 374 | 293 |
| 3 | 30 | 5 | 55 | 10 | 370 | 304 |
| 4 | 30 | 10 | 5 | 55 | 327 | 305 |
| 5 | 30 | 10 | 10 | 50 | 375 | 380 |
| 6 | 30 | 10 | 20 | 20 | 384 | 377 |
| 7 | 30 | 10 | 50 | 10 | 373 | 369 |
| 8 | 30 | 10 | 55 | 5 | 328 | 319 |
| 9 | 30 | 20 | 25 | 25 | 388 | 383 |
| 10 | 30 | 30 | 15 | 25 | 391 | 390 |
| 11 | 30 | 30 | 25 | 15 | 379 | 383 |
| 12 | 30 | 40 | 15 | 15 | 388 | 385 |
| 13 | 30 | 50 | 5 | 15 | 333 | 327 |
| 14 | 30 | 50 | 10 | 10 | 365 | 372 |
| 15 | 30 | 50 | 15 | 5 | 315 | 325 |
| 16 | 30 | 55 | 7.5 | 7.5 | 326 | 322 |

TABLE 18-3

| Sample | CaO | Al₂O₃ | SiO₂ | Y₂O₃ | Room Temp | 1000° C. |
|---|---|---|---|---|---|---|
| 1 | 50 | 5 | 10 | 35 | 382 | 290 |
| 2 | 50 | 5 | 25 | 20 | 377 | 285 |
| 3 | 50 | 5 | 35 | 10 | 365 | 288 |
| 4 | 50 | 10 | 5 | 35 | 323 | 314 |
| 5 | 50 | 10 | 10 | 30 | 378 | 360 |
| 6 | 50 | 10 | 20 | 20 | 383 | 358 |
| 7 | 50 | 10 | 30 | 10 | 380 | 365 |
| 8 | 50 | 10 | 35 | 5 | 331 | 320 |
| 9 | 50 | 20 | 15 | 15 | 383 | 359 |
| 10 | 50 | 30 | 5 | 15 | 322 | 310 |
| 11 | 50 | 30 | 10 | 10 | 365 | 354 |
| 12 | 50 | 30 | 15 | 5 | 320 | 295 |
| 13 | 50 | 35 | 7.5 | 7.5 | 338 | 303 |

TABLE 19

| Sample | CaO | Al₂O₃ | Si₃N₄ | Room Temp | 1000° C. |
|---|---|---|---|---|---|
| 1 | 10 | 45 | 45 | — | — |
| 2 | 10 | 60 | 30 | — | — |
| 3 | 10 | 75 | 15 | — | — |
| 4 | 15 | 35 | 50 | — | — |
| 5 | 15 | 40 | 45 | 341 | 339 |
| 6 | 15 | 55 | 30 | 339 | 340 |
| 7 | 15 | 70 | 15 | 344 | 347 |
| 8 | 15 | 75 | 10 | 295 | 290 |
| 9 | 25 | 45 | 30 | 333 | 343 |
| 10 | 35 | 25 | 40 | 367 | 350 |
| 11 | 35 | 45 | 20 | 360 | 359 |
| 12 | 45 | 10 | 45 | 354 | 355 |
| 13 | 45 | 25 | 30 | 343 | 348 |
| 14 | 50 | 5 | 45 | — | — |
| 15 | 50 | 10 | 40 | 340 | 330 |
| 16 | 50 | 20 | 30 | 338 | 329 |
| 17 | 50 | 35 | 15 | 322 | 319 |
| 18 | 50 | 40 | 10 | 287 | 285 |
| 19 | 55 | 20 | 25 | 313 | 233 |

TABLE 20-1

| Sample | CaO | Al₂O₃ | SiO₂ | Si₃N₄ | Room Temp | 1000° C. |
|---|---|---|---|---|---|---|
| 1 | 15 | 5 | 35 | 45 | 361 | 309 |
| 2 | 15 | 5 | 50 | 30 | 371 | 300 |
| 3 | 15 | 5 | 65 | 15 | 366 | 312 |
| 4 | 15 | 10 | 25 | 50 | — | — |
| 5 | 15 | 10 | 30 | 45 | 373 | 365 |
| 6 | 15 | 10 | 45 | 30 | 381 | 370 |
| 7 | 15 | 10 | 60 | 15 | 382 | 381 |
| 8 | 15 | 10 | 65 | 10 | 335 | 330 |
| 9 | 15 | 20 | 35 | 30 | 372 | 374 |
| 10 | 15 | 30 | 10 | 45 | 383 | 383 |
| 11 | 15 | 30 | 25 | 30 | 393 | 390 |
| 12 | 15 | 40 | 20 | 25 | 380 | 391 |
| 13 | 15 | 50 | 15 | 20 | 375 | 379 |
| 14 | 15 | 60 | 5 | 20 | 345 | 333 |
| 15 | 15 | 60 | 10 | 15 | 365 | 372 |
| 16 | 15 | 60 | 15 | 10 | 319 | 326 |
| 17 | 15 | 65 | 10 | 10 | 323 | 315 |

TABLE 20-2

| sample | CaO | Al$_2$O$_3$ | SiO$_2$ | Si$_3$N$_4$ | Room Temp | 1000° C. |
|---|---|---|---|---|---|---|
| 1 | 30 | 5 | 20 | 45 | 374 | 321 |
| 2 | 30 | 5 | 35 | 30 | 366 | 315 |
| 3 | 30 | 5 | 50 | 15 | 375 | 308 |
| 4 | 30 | 10 | 10 | 50 | — | — |
| 5 | 30 | 10 | 15 | 45 | 376 | 371 |
| 6 | 30 | 10 | 30 | 30 | 369 | 360 |
| 7 | 30 | 10 | 45 | 15 | 375 | 377 |
| 8 | 30 | 10 | 50 | 10 | 338 | 341 |
| 9 | 30 | 15 | 10 | 45 | 371 | 362 |
| 10 | 30 | 15 | 25 | 30 | 396 | 385 |
| 11 | 30 | 25 | 20 | 25 | 388 | 377 |
| 12 | 30 | 25 | 20 | 25 | 379 | 366 |
| 13 | 30 | 35 | 15 | 20 | 383 | 379 |
| 14 | 30 | 45 | 5 | 20 | 341 | 322 |
| 15 | 30 | 45 | 10 | 15 | 365 | 358 |
| 16 | 30 | 45 | 15 | 10 | 332 | 325 |
| 17 | 30 | 50 | 10 | 10 | 318 | 323 |

TABLE 20-3

| Sample | CaO | Al$_2$O$_3$ | SiO$_2$ | Si$_3$N$_4$ | Room Temp | 1000° C. |
|---|---|---|---|---|---|---|
| 1 | 50 | 5 | 10 | 35 | 355 | 303 |
| 2 | 50 | 5 | 25 | 20 | 362 | 298 |
| 3 | 50 | 5 | 30 | 15 | 358 | 309 |
| 4 | 50 | 10 | 5 | 35 | 343 | 311 |
| 5 | 50 | 10 | 10 | 30 | 375 | 376 |
| 6 | 50 | 10 | 20 | 20 | 380 | 375 |
| 7 | 50 | 10 | 25 | 15 | 369 | 365 |
| 8 | 50 | 10 | 30 | 10 | 333 | 340 |
| 9 | 50 | 20 | 10 | 20 | 375 | 366 |
| 10 | 50 | 20 | 15 | 15 | 369 | 365 |
| 11 | 50 | 25 | 5 | 20 | 340 | 341 |
| 12 | 50 | 25 | 10 | 15 | 377 | 364 |
| 13 | 50 | 25 | 15 | 10 | 318 | 315 |
| 14 | 50 | 30 | 10 | 10 | 320 | 315 |

TABLE 21

| Sample | MgO | Al$_2$O$_3$ | Room Temp | 900° C. |
|---|---|---|---|---|
| 1 | 100 | 0 | 275 | 35 |
| 2 | 5 | 95 | — | — |
| 3 | 10 | 90 | 285 | 279 |
| 4 | 20 | 80 | 292 | 282 |
| 5 | 35 | 65 | 283 | 276 |
| 6 | 45 | 55 | 276 | 260 |
| 7 | 50 | 50 | 281 | 205 |

TABLE 22

| Sample | MgO | Al$_2$O$_3$ | SiO$_2$ | Room Temp | 900° C. |
|---|---|---|---|---|---|
| 1 | 5 | 10 | 85 | — | — |
| 2 | 5 | 45 | 45 | 11 | — |
| 3 | 5 | 85 | 10 | — | — |
| 4 | 10 | 5 | 85 | 315 | 243 |
| 5 | 10 | 10 | 80 | 319 | 309 |
| 6 | 10 | 45 | 45 | 337 | 329 |
| 7 | 10 | 80 | 10 | 311 | 309 |
| 8 | 10 | 90 | 5 | 281 | 282 |
| 9 | 20 | 40 | 40 | 325 | 317 |
| 10 | 30 | 35 | 25 | 338 | 315 |
| 11 | 40 | 30 | 30 | 335 | 333 |
| 12 | 45 | 5 | 50 | 332 | 214 |
| 13 | 45 | 10 | 45 | 318 | 314 |
| 14 | 45 | 22.5 | 22.5 | 319 | 324 |
| 15 | 45 | 45 | 10 | 321 | 318 |
| 16 | 45 | 50 | 5 | 287 | 271 |
| 17 | 50 | 10 | 40 | 322 | 119 |
| 18 | 50 | 25 | 25 | 319 | 227 |
| 19 | 50 | 40 | 10 | 321 | 225 |

TABLE 23

| Sample | MgO | Al$_2$O$_3$ | Y$_2$O$_3$ | Room Temp | 900° C. |
|---|---|---|---|---|---|
| 1 | 5 | 85 | 10 | — | — |
| 2 | 5 | 65 | 30 | — | — |
| 3 | 5 | 40 | 55 | — | — |
| 4 | 10 | 85 | 5 | 244 | 240 |
| 5 | 10 | 80 | 10 | 331 | 329 |
| 6 | 10 | 60 | 30 | 328 | 326 |
| 7 | 10 | 35 | 55 | 333 | 315 |
| 8 | 10 | 30 | 60 | 321 | 255 |
| 9 | 20 | 45 | 35 | 349 | 345 |
| 10 | 35 | 35 | 30 | 339 | 342 |
| 11 | 35 | 10 | 55 | 341 | 321 |
| 12 | 40 | 55 | 5 | 276 | 270 |
| 13 | 40 | 50 | 10 | 323 | 333 |
| 14 | 40 | 40 | 30 | 330 | 328 |
| 15 | 40 | 10 | 50 | 332 | 319 |
| 16 | 40 | 5 | 55 | 318 | 266 |
| 17 | 45 | 45 | 10 | 315 | 263 |
| 18 | 45 | 25 | 30 | 324 | 275 |
| 19 | 45 | 10 | 45 | 320 | 269 |

TABLE 24-1

| Sample | MgO | Al$_2$O$_3$ | SiO$_2$ | Y$_2$O$_3$ | Room Temp | 900° C. |
|---|---|---|---|---|---|---|
| 1 | 10 | 5 | 75 | 10 | 357 | 314 |
| 2 | 10 | 5 | 55 | 30 | 361 | 298 |
| 3 | 10 | 5 | 30 | 55 | 363 | 300 |
| 4 | 10 | 10 | 75 | 5 | 332 | 321 |
| 5 | 10 | 10 | 70 | 10 | 365 | 358 |
| 6 | 10 | 10 | 45 | 35 | 376 | 365 |
| 7 | 10 | 10 | 25 | 55 | 378 | 377 |
| 8 | 10 | 10 | 20 | 60 | 356 | 310 |
| 9 | 10 | 25 | 30 | 35 | 389 | 378 |
| 10 | 10 | 25 | 10 | 55 | 387 | 369 |
| 11 | 10 | 45 | 25 | 30 | 391 | 390 |
| 12 | 10 | 55 | 15 | 20 | 385 | 388 |
| 13 | 10 | 70 | 15 | 5 | 313 | 308 |
| 14 | 10 | 70 | 10 | 10 | 361 | 359 |
| 15 | 10 | 70 | 5 | 15 | 333 | 334 |
| 16 | 10 | 75 | 7.5 | 7.5 | 303 | 310 |

TABLE 24-2

| Sample | MgO | Al$_2$O$_3$ | SiO$_2$ | Y$_2$O$_3$ | Room Temp | 900° C. |
|---|---|---|---|---|---|---|
| 1 | 30 | 5 | 10 | 55 | 365 | 303 |
| 2 | 30 | 5 | 35 | 30 | 357 | 289 |
| 3 | 30 | 5 | 55 | 10 | 361 | 302 |
| 4 | 30 | 10 | 5 | 55 | 319 | 311 |
| 5 | 30 | 10 | 10 | 50 | 371 | 372 |
| 6 | 30 | 10 | 20 | 20 | 370 | 365 |
| 7 | 30 | 10 | 50 | 10 | 366 | 360 |
| 8 | 30 | 10 | 55 | 5 | 320 | 323 |
| 9 | 30 | 20 | 25 | 25 | 381 | 390 |
| 10 | 30 | 30 | 15 | 25 | 392 | 378 |
| 11 | 30 | 30 | 25 | 15 | 388 | 382 |
| 12 | 30 | 40 | 15 | 15 | 390 | 386 |
| 13 | 30 | 50 | 5 | 15 | 323 | 313 |
| 14 | 30 | 50 | 10 | 10 | 369 | 370 |
| 15 | 30 | 50 | 15 | 5 | 310 | 313 |
| 16 | 30 | 55 | 7.5 | 7.5 | 299 | 295 |

TABLE 24-3

| sample | MgO | Al$_2$O$_3$ | SiO$_2$ | Y$_2$O$_3$ | Room Temp | 900° C. |
|---|---|---|---|---|---|---|
| 1 | 45 | 5 | 10 | 40 | 381 | 293 |
| 2 | 45 | 5 | 25 | 25 | 377 | 303 |
| 3 | 45 | 5 | 40 | 10 | 372 | 305 |
| 4 | 45 | 10 | 5 | 40 | 331 | 329 |
| 5 | 45 | 10 | 10 | 35 | 380 | 378 |
| 6 | 45 | 10 | 20 | 25 | 396 | 389 |
| 7 | 45 | 10 | 35 | 10 | 385 | 386 |
| 8 | 45 | 10 | 40 | 5 | 329 | 323 |
| 9 | 45 | 20 | 15 | 20 | 379 | 377 |

TABLE 24-3-continued

| sample | MgO | Al$_2$O$_3$ | SiO$_2$ | Y$_2$O$_3$ | Room Temp | 900° C. |
|---|---|---|---|---|---|---|
| 10 | 45 | 30 | 10 | 15 | 381 | 375 |
| 11 | 45 | 35 | 5 | 15 | 323 | 311 |
| 12 | 45 | 35 | 10 | 10 | 373 | 359 |
| 13 | 45 | 35 | 15 | 5 | 319 | 308 |
| 14 | 45 | 40 | 7.5 | 7.5 | 305 | 316 |

TABLE 25

| Sample | MgO | Al$_2$O$_3$ | Si$_3$N$_4$ | Room Temp | 900° C. |
|---|---|---|---|---|---|
| 1 | 5 | 50 | 45 | — | — |
| 2 | 5 | 65 | 30 | — | — |
| 3 | 5 | 80 | 15 | — | — |
| 4 | 10 | 40 | 50 | — | — |
| 5 | 10 | 45 | 45 | 343 | 339 |
| 6 | 10 | 60 | 30 | 351 | 348 |
| 7 | 10 | 75 | 15 | 309 | 315 |
| 8 | 10 | 80 | 10 | 288 | 275 |
| 9 | 25 | 55 | 20 | 329 | 331 |
| 10 | 25 | 35 | 40 | 341 | 340 |
| 11 | 35 | 35 | 30 | 333 | 329 |
| 12 | 45 | 5 | 50 | — | — |
| 13 | 45 | 10 | 45 | 324 | 318 |
| 14 | 45 | 25 | 30 | 327 | 315 |
| 15 | 45 | 40 | 15 | 325 | 322 |
| 16 | 45 | 45 | 10 | 297 | 275 |
| 17 | 50 | 10 | 40 | 315 | 257 |
| 18 | 50 | 20 | 30 | 309 | 261 |
| 19 | 50 | 5 | 45 | 303 | 245 |

TABLE 26-1

| Sample | MgO | Al$_2$O$_3$ | SiO$_2$ | Si$_3$N$_4$ | Room Temp | 900° C. |
|---|---|---|---|---|---|---|
| 1 | 10 | 5 | 40 | 45 | 370 | 305 |
| 2 | 10 | 5 | 55 | 30 | 372 | 315 |
| 3 | 10 | 5 | 70 | 15 | 368 | 308 |
| 4 | 10 | 10 | 30 | 50 | — | — |
| 5 | 10 | 10 | 35 | 45 | 373 | 369 |
| 6 | 10 | 10 | 50 | 30 | 381 | 375 |
| 7 | 10 | 10 | 65 | 15 | 375 | 365 |
| 8 | 10 | 10 | 70 | 10 | 332 | 328 |
| 9 | 10 | 25 | 25 | 40 | 395 | 387 |
| 10 | 10 | 35 | 25 | 30 | 389 | 383 |
| 11 | 10 | 35 | 10 | 45 | 371 | 385 |
| 12 | 10 | 45 | 15 | 30 | 381 | 386 |
| 13 | 10 | 55 | 15 | 20 | 375 | 379 |
| 14 | 10 | 65 | 5 | 20 | 331 | 313 |
| 15 | 10 | 65 | 10 | 15 | 365 | 358 |
| 16 | 10 | 65 | 15 | 10 | 322 | 315 |
| 17 | 10 | 70 | 10 | 10 | 308 | 313 |

TABLE 26-2

| Sample | MgO | Al$_2$O$_3$ | SiO$_2$ | Si$_3$N$_4$ | Room Temp | 900° C. |
|---|---|---|---|---|---|---|
| 1 | 30 | 5 | 20 | 45 | 368 | 319 |
| 2 | 30 | 5 | 35 | 30 | 369 | 307 |
| 3 | 30 | 5 | 50 | 15 | 373 | 314 |
| 4 | 30 | 10 | 10 | 50 | — | — |
| 5 | 30 | 10 | 15 | 45 | 389 | 385 |
| 6 | 30 | 10 | 30 | 30 | 394 | 390 |
| 7 | 30 | 10 | 45 | 15 | 375 | 382 |
| 8 | 30 | 10 | 50 | 10 | 321 | 318 |
| 9 | 30 | 15 | 10 | 45 | 369 | 371 |
| 10 | 30 | 15 | 25 | 30 | 380 | 375 |
| 11 | 30 | 25 | 20 | 25 | 375 | 373 |
| 12 | 30 | 25 | 25 | 20 | 375 | 370 |
| 13 | 30 | 35 | 15 | 20 | 361 | 375 |
| 14 | 30 | 45 | 5 | 20 | 319 | 309 |
| 15 | 30 | 45 | 10 | 15 | 361 | 359 |
| 16 | 30 | 45 | 15 | 10 | 299 | 312 |
| 17 | 30 | 50 | 10 | 10 | 309 | 312 |

TABLE 26-3

| Sample | MgO | Al$_2$O$_3$ | SiO$_2$ | Si$_3$N$_4$ | Room Temp | 900° C. |
|---|---|---|---|---|---|---|
| 1 | 45 | 5 | 10 | 40 | 371 | 294 |
| 2 | 45 | 5 | 20 | 30 | 365 | 315 |
| 3 | 45 | 5 | 35 | 15 | 369 | 310 |
| 4 | 45 | 10 | 5 | 40 | 332 | 312 |
| 5 | 45 | 10 | 10 | 35 | 381 | 383 |
| 6 | 45 | 10 | 20 | 25 | 379 | 372 |
| 7 | 45 | 10 | 30 | 15 | 384 | 376 |
| 8 | 45 | 10 | 35 | 10 | 329 | 317 |
| 9 | 45 | 20 | 10 | 25 | 395 | 396 |
| 10 | 45 | 20 | 15 | 20 | 392 | 387 |
| 11 | 45 | 30 | 15 | 10 | 318 | 315 |
| 12 | 45 | 30 | 10 | 15 | 372 | 359 |
| 13 | 45 | 30 | 5 | 20 | 322 | 321 |
| 14 | 45 | 35 | 10 | 10 | 312 | 318 |

TABLE 27

| Sample | MgO | NiO | Room Temp | 900° C. |
|---|---|---|---|---|
| 1 | 35 | 65 | — | — |
| 2 | 40 | 60 | 219 | 225 |
| 3 | 60 | 40 | 236 | 222 |
| 4 | 75 | 25 | 238 | 241 |
| 5 | 90 | 10 | 244 | 233 |
| 6 | 95 | 5 | 221 | 85 |

TABLE 28

| Sample | MgO | MnO | Room Temp | 900° C. |
|---|---|---|---|---|
| 1 | 20 | 80 | — | — |
| 2 | 25 | 75 | 247 | 250 |
| 3 | 50 | 50 | 237 | 246 |
| 4 | 60 | 40 | 275 | 255 |
| 5 | 70 | 30 | 280 | 293 |
| 6 | 80 | 20 | 248 | 261 |
| 7 | 85 | 15 | 255 | 36 |

TABLE 29

| Sample | MgO | SrO$_2$ | Room Temp | 900° C. |
|---|---|---|---|---|
| 1 | 25 | 75 | — | — |
| 2 | 30 | 70 | 267 | 273 |
| 3 | 50 | 50 | 296 | 281 |
| 4 | 70 | 30 | 297 | 290 |
| 5 | 90 | 10 | 291 | 289 |
| 6 | 95 | 5 | 275 | 71 |

TABLE 30

| Sample | MgO | ZnO | Room Temp | 900° C. |
|---|---|---|---|---|
| 1 | 35 | 65 | — | — |
| 2 | 40 | 60 | 223 | 236 |
| 3 | 60 | 40 | 250 | 248 |
| 4 | 75 | 25 | 251 | 266 |
| 5 | 90 | 10 | 238 | 222 |
| 6 | 95 | 5 | 245 | 83 |

TABLE 31

| Sample | MgO | TiO$_2$ | Room Temp | 900° C. |
|---|---|---|---|---|
| 1 | 45 | 55 | — | — |
| 2 | 50 | 50 | 275 | 282 |
| 3 | 65 | 35 | 284 | 280 |
| 4 | 80 | 20 | 299 | 288 |
| 5 | 90 | 10 | 265 | 275 |
| 6 | 95 | 5 | 277 | 42 |

The joining agents of the above embodiment are applied for the silicon nitride ceramics having a high heat resistance. However, the joining agents according to the present invention are applicable for ceramics including a silicon nitride component such as sialon ceramics.

Further, the joining agents according to the present invention can be prepared by using the compound of alumina and silica such as kaolinite ($Al_2O_3 \cdot 2\ SiO_2 \cdot 2\ H_2O$) and mullite ($3\ Al_2O_3 \cdot 2\ SiO_2$) in place of a mixture of individual alumina and silica.

In such a way, the joining agents according to the present invention include, as an electric conductive component, alkaline earth element oxide and achieve the joint part strength practically usable at high temperature and are very suitable for joining the ceramic body having a high heat resistance.

The joining agents shown in examples 1 to 10 includes, as an electric conductive component, one kind of material. However, it is possible to use more than two kinds of electric conductive materials.

In the above embodiments, the electric joining process with the joining agents according to the present invention is carried out in air but can be carried out in an inert gas such as Ar gas or in $N_2$ gas.

The effect of the joining agents according to the present invention is confirmed by a basic electric joining method. The joining agents according to the present invention are applicable for the improved joining methods which are being applied for another application (PCT/JP91/00560) and are aimed at the joining of ceramic body in a large size or in a long size.

What is claimed is:

1. A joining agent which is used for joining ceramic bodies by an electric joining method comprising:
    a composition of:
    (a) an electric conductive component effective for providing an electric conductivity to said composition at an electric current supplying time; and
    (b) a joining component for providing an effective wetability to the ceramic bodies at the molten state of the joining agent and an effective joining strength in the solidified state;
    wherein said electric conductive component is an ion conductor selected from the group consisting of fluorides, chlorides, alkali metal oxides and alkaline earth metal oxides and is selected so as to form carrier ions during pro-heating which provide said joining agent with an electric conductivity higher than that of the ceramic bodies at the electric current supplying time, whereby said electric conductive component and said joining component are selected in effective amounts such that the electric resistance of said joining agent increases gradually at said molten state by decreasing the density or the mobility of said carrier ions;
    wherein said composition comprises 10 to 40 weight % of $CaF_2$, as said electric conductive component and more than 10 weight % of $Al_2O_3$, 15 to 45 weight % of $Si_3N_4$ and the residual of $SiO_2$ as said joining component.

2. A joining agent which is used for joining ceramic bodies by an electric joining method comprising:
    a composition of:
    (a) an electric conductive component effective for providing an electric conductivity to said composition at an electric current supplying time; and
    (b) a joining component for providing an effective wetability to the ceramic bodies at the molten state of the joining agent and an effective joining strength in the solidified state;
    wherein said electric conductive component is an ion conductor selected from the group consisting of fluorides, chlorides, alkali metal oxides and alkaline earth metal oxides and is selected so as to form carrier ions during pre-heating which provide said joining agent with an electric conductivity higher than that of the ceramic bodies at the electric current supplying time, whereby said electric conductive component and said joining component are selected in effective amounts such that the electric resistance of said joining agent increases gradually at said molten state by decreasing the density or the mobility of said carrier ions;
    wherein said composition comprises 10 to 40 weight % of $CaF_2$, as said electric conductive component and more than 10 weight % of $Al_2O_3$, 10 to 55 weight % of $Y_2O_3$, 15 to 45 weight % of $Si_3N_4$ and the residual of $SiO_2$ as said joining component.

3. A joining agent which is used for joining ceramic bodies by an electric joining method comprising:
    a composition of:
    (a) an electric conductive component effective for providing an electric conductivity to said composition at an electric current supplying time; and
    (b) a joining component for providing an effective wetability to the ceramic bodies at the molten state of the joining agent and an effective joining strength in the solidified state;
    wherein said electric conductive component is an ion conductor selected from the group consisting of fluorides, chlorides, alkali metal oxides and alkaline earth metal oxides and is selected so as to form carrier ions during pre-heating which provide said joining agent with an electric conductivity higher than that of the ceramic bodies at the electric current supplying time, whereby said electric conductive component and said joining component are selected in effective amounts such that the electric resistance of said joining agent increases gradually at said molten state by decreasing the density or the mobility of said carrier ions;
    wherein said composition comprises more than 15 weight % of at least one compound selected from the group consisting of $ScF_3$ and $YF_3$ as said electric conductive component and the residual of at least one compound selected from the group consisting of $Al_2O_3$ and $SiO_2$ as said joining component.

* * * * *

UNITED STATES PATENT AND TRADEMARK OFFICE
CERTIFICATE OF CORRECTION

PATENT NO. : 5,352,385

DATED : October 4, 1994

INVENTOR(S) : Hiroaki Yanagida, et al.

Page 1 of 2

It is certified that error appears in the above-indentified patent and that said Letters Patent is hereby corrected as shown below:

In the Abstract, line 1: "in" should read --is--
    Column 2, line 36: "uniformily" should read --uniformly--
    Column 3, line 29: "rosined" should read --formed--
    Column 3, line 62: "SCF$_3$" should read --ScF$_3$--
    Column 4, line 4: "CaF$_2$are" should read --CaF$_2$ are--
    Column 5, line 8: "and-stable" should read --and stable--
    Column 7, line 32: "IIIA" should read --III A--
    Column 9, line 46: "CaF2" should read --CaF$_2$--
    Column 16, line 28, Table 11: "15" should read --16--
    Column 16, line 53: "(Al$_2$O3." should read --(Al$_2$O$_3$.--
    Column 17, lines 39 & 56: "Conventonal" should read --Conventional--

UNITED STATES PATENT AND TRADEMARK OFFICE
CERTIFICATE OF CORRECTION

PATENT NO. : 5,352,385
DATED : October 4, 1994
INVENTOR(S) : Hiroaki Yanagida, et al.

It is certified that error appears in the above-indentified patent and that said Letters Patent is hereby corrected as shown below:

```
Column 19, line 28:  "is" should read --15--
Column 19, line 68:  "after "result" delete -- - --
Column 20, line 23:  "Si3N4are" should read
--Si3N4 are--
Column 20, line 26:  "agent" should read --agents--
Column 20, line 28:  "is" should read --are--
Column 20, line 47:  "transient" should read
--transition--
Column 27, line 8:   "wayt" should read --way,--
Column 27, line 46, Claim 1: "pro-heating" should read
--pre-heating--
```

Signed and Sealed this

Fifth Day of December, 1995

Attest:

Attesting Officer

BRUCE LEHMAN

Commissioner of Patents and Trademarks